(12) United States Patent
Bouti

(10) Patent No.: US 7,458,803 B2
(45) Date of Patent: Dec. 2, 2008

(54) COMPOSITE INJECTION MOLDING COMPONENT

(75) Inventor: Abdeslam Bouti, Swanton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 162 days.

(21) Appl. No.: 11/679,260

(22) Filed: Feb. 27, 2007

(65) Prior Publication Data

US 2008/0206395 A1 Aug. 28, 2008

(51) Int. Cl.
*B29C 45/20* (2006.01)
(52) U.S. Cl. .................. 425/542; 425/549; 425/572
(58) Field of Classification Search .................. 425/542, 425/549, 572, 577
See application file for complete search history.

(56) References Cited

U.S. PATENT DOCUMENTS

| | | | |
|---|---|---|---|
| 4,392,302 A | 7/1983 | Saito | |
| 4,451,974 A | 6/1984 | Gellert | |
| 4,754,950 A | 7/1988 | Tada et al. | |
| 4,923,387 A | 5/1990 | Gellert | |
| 4,950,154 A | 8/1990 | Moberg | |
| 4,956,026 A | 9/1990 | Bell | |
| 5,208,052 A | 5/1993 | Schmidt et al. | |
| 5,299,928 A | 4/1994 | Gellert | |
| 5,824,077 A | 10/1998 | Mayer | |
| 6,129,795 A * | 10/2000 | Lehockey et al. | ............ 148/608 |
| 6,164,954 A | 12/2000 | Mortazavi et al. | |
| 6,220,850 B1 | 4/2001 | Catoen et al. | |
| 6,561,790 B2 | 5/2003 | Blais et al. | |
| 6,609,902 B1 | 8/2003 | Blais et al. | |
| 6,861,161 B2 | 3/2005 | Ponemayr et al. | |
| 7,108,503 B2 | 9/2006 | Olaru | |
| 7,128,980 B2 * | 10/2006 | Schedler et al. | ............. 428/553 |
| 2005/0045746 A1 | 3/2005 | Blais | |
| 2006/0151139 A1 | 7/2006 | Koyama et al. | |
| 2006/0196626 A1 | 9/2006 | Decker et al. | |
| 2006/0265854 A1 | 11/2006 | Blais | |

OTHER PUBLICATIONS

Statement by Applicant.

* cited by examiner

*Primary Examiner*—Tim Heitbrink

(57) ABSTRACT

A composite material component for an injection molding assembly includes a first portion formed of a precipitation hardened, high thermal conductivity material and a second portion formed of a precipitation hardened, high strength material, which are integrally joined together. The thermal conductivity of the high thermal conductivity material is greater than the thermal conductivity of the high strength material, and at least one strength aspect of the high strength material has a value greater than the corresponding value of the same strength aspect of the high thermal conductivity material. The high thermal conductivity material and the high strength material can be precipitation hardened together under the same precipitation hardening conditions to achieve increases in the value of at least one strength aspect of the high thermal conductivity material and the value of at least one strength aspect of the high strength material, relative to their respective unhardened conditions.

34 Claims, 19 Drawing Sheets

COMPOSITE INJECTION MOLDING COMPONENT

TECHNICAL FIELD

The invention relates, generally, to injection molding systems, and more particularly, but not exclusively, to hot runner components and injection molding systems comprising such components.

BACKGROUND OF THE INVENTION

The state of the art includes various components for hot runner injection molding systems, including nozzles and nozzle tips. Hot-runner nozzles are typically either a valve-gate style or a hot-tip style. In the valve-gate style, a separate stem moves inside the nozzle and tip acting as a valve to selectively start and stop the flow of resin through the nozzle. In the hot-tip style, a small gate area at the end of the tip freezes off to thereby stop the flow of resin through the nozzle.

An injection molding system using a hot-tip style nozzle typically has a cooled mold with a small circular gate opening in which the tip of the nozzle is inserted. The tip is typically conical with a tapered point or other suitable configuration. In operation, the tapered point is positioned in the circular gate to thereby form an annular opening through which molten plastic or other material is then transferred from the nozzle to the mold. When the mold is full, flow stops. In an ideal plastic molding cycle, the mold is typically cooled so that the plastic injected into it soon solidifies. As the liquid plastic in the mold cools it shrinks, which continues to allow plastic from the nozzle to move into the mold. This step is referred to as "packing". The nozzle is typically heated so that the molten plastic contained within it remains liquid. The hot plastic moving through the gate area during packing keeps the gate area from freezing until all the plastic in the part has solidified. Eventually the gate freezes, the mold is opened, and the part is ejected, thereby breaking the small amount of frozen plastic at the gate area.

If the mold is opened before the gate has frozen, the plastic will string from the nozzle to the mold. This is known as a "gate stringing" and is unacceptable because the plastic string must be removed from the part in a subsequent operation, or the part scrapped. Waiting a long time for the gate to freeze is also unacceptable because it adds time to the molding cycle, which is desired to be as short as possible to optimize system productivity.

Many prior art nozzle tips function in essentially the same way, using the high thermal conductivity of the tip insert to conduct heat from the heated nozzle body to the gate area. The heat from the nozzle tip opens the gate at the beginning of the injection cycle and keeps it open during the injection process, and cooling from the mold cools and eventually freezes the gate after packing is complete. If the tip is not hot enough, the gate may not open and injection will not occur, or the gate will freeze too soon causing poor-quality parts. If too much heat is transferred to the tip, the gate will not freeze, resulting in stringing gates. Therefore, for any particular nozzle tip and resin there is an operating temperature window between the minimum temperature needed to get the gate open and keep it open as desired through the molding process, and the maximum temperature at which parts can be made without stringing gates. If the operating window is narrow, it may be difficult for molds with multiple cavities to consistently make good parts in all cavities because of the many variables associated with the injection molding process. One factor is assembly tolerance stack up that varies tip heights in the gate. For a conical tip, variations in tip height cause variations in the size of the annulus between the tip and the gate through which molten plastic flows. Another factor is variation in temperature of the resin from the nozzle to nozzle due to heat loss at various portions in the hot runner, or from flow imbalance in the hot runner. Furthermore, resins have melt flow characteristics and an optimum temperature range for processing that determines what processing parameters are used in the injection molding process. The flow characteristic for a resin inherently varies from batch to batch. To keep resin costs down and to preclude sorting resin by batch, molders often purchase resins in large quantities with a specification allowing a large range for flow characteristic. One batch of resin may run adequately for a given set of processing parameters, but the next batch, having a different flow characteristic, may not produce good parts using exactly the same process settings.

If the nozzle does not provide enough heat at the tip to keep the gate from freezing before the part is fully injected and packed, the part may have voids or other quality problems making it unacceptable. Heat is applied to the nozzle body by well-known techniques and is conducted to the nozzle tip. Thus, in the prior art, the tip material is generally made of high-conductivity material that promotes the flow of heat to the nozzle tip, such as a beryllium-copper alloy. It is important that the nozzle tip provide the right amount of heat at the gate area to keep the plastic in a liquid state as it flows through the gate, but also that it allows the plastic to freeze in a reasonable time when flow has stopped.

The tip must also resist corrosion, sustain compressive loads from injection pressures that may reach, e.g., from 26 ksi (179 MPa) to 40 ksi, (275 MPa) or higher at temperatures that may reach, e.g., 350° C., and resist wear when used with molding material such as plastics containing fillers, e.g., glass or other particulate materials. Since tips can wear out, it is desirable that they be easily replaceable. Thus, the nozzle tip must provide sufficient strength and resilience to sustain repeated uses under high temperature and pressure without failure. However, at these high pressures, existing nozzle tips exhibit an unacceptable failure rate. For example, beryllium-copper alloys are precipitation hardenable, and thus, can provide relatively high strength and wear-resistance, but low fatigue resistance. Accordingly, a great need exists for a nozzle tip that can adequately conduct heat, while possessing sufficient wear resistance and strength, particularly fatigue or endurance strength, to increase both the lifetime of the part and the maximum operating pressure. It is also desirable that tips be easily changed to process different materials. Other components of an injection molding assembly are subjected to similarly high stresses and temperatures, and thus, would also benefit from a component with high thermal conductivity and high strength.

U.S. Pat. No. 6,220,850 discloses a mold gate insert for a valve-gate style injection molding machine that is formed of two portions of differing materials. The material for the first portion is selected for its hardness and wear resistance, and non-precipitation hardening materials such as H13 tool steel, 420 ESR tool steel, and Vespel are disclosed as suitable materials. The material for the second portion is selected for its thermal conductivity, and beryllium copper alloy BeCu25 is disclosed as a suitable material. The first portion and second portion are joined together by physical means, such as press-fitting or swaging.

U.S. Patent Application Publication No. 2006/0196626 discloses the use of maraging steel alloys in injection molding machinery for providing better wear resistance and fatigue strength.

U.S. Pat. No. 4,451,974 discloses a nozzle for a valve-gate style injection molding machine that is formed of an outer conductive portion and a corrosion-resistant inner liner which are threaded together. The outer conductive portion is formed of a beryllium-copper alloy and the inner liner is formed of stainless steel.

U.S. Patent Application Publication No. 2005/0045746 discloses various components of a hot runner injection molding system, having a first portion and a second portion formed of different materials and fused together. The disclosure describes that the identities of the materials can be chosen for such material properties as thermal conductivity, wear resistance, strength, and resiliency.

U.S. Pat. No. 6,609,902 discloses a nozzle tip assembly that includes a nozzle tip retainer having high thermal conductivity, which holds a nozzle tip insert having lower thermal conductivity and high wear resistance. Materials disclosed for the conductive retainer include copper alloys and beryllium-copper alloys, and materials disclosed for the less conductive tip insert include stainless steel, tool steel, and carbide.

U.S. Pat. No. 6,164,954 discloses an injection nozzle that includes an inner portion formed of a material having high wear resistance and excellent thermal conductivity and an outer portion formed of a material having high pressure resistance and good thermal conductivity. The inner portion and the outer portion are joined together with a press-fit or interference fit to form the nozzle.

The present composite component and assembly are provided to address the problems discussed above and other problems, and to provide advantages and aspects not provided by prior components and assemblies of this type. A full discussion of the features and advantages of the present invention is provided in the following summary and detailed description, which proceeds with reference to the accompanying drawings.

SUMMARY OF THE INVENTION

The present disclosure provides a composite material component for an injection molding assembly that includes a first portion formed of a precipitation hardened, high thermal conductivity material and a second portion formed of a precipitation hardened, high strength material, which are integrally joined together. The thermal conductivity of the high thermal conductivity material is greater than the thermal conductivity of the high strength material, and at least one strength aspect of the high strength material has a value greater than the corresponding value of the same strength aspect of the high thermal conductivity material. The high thermal conductivity material and the high strength material can be precipitation hardened together under the same precipitation hardening conditions to achieve an increase in the value of at least one strength aspect of the high thermal conductivity material relative to the unhardened condition, and an increase in the value of at least one strength aspect of the high strength material relative to the unhardened condition.

According to one aspect, the high thermal conductivity material and the high strength material can be precipitation hardened together at approximately 450° C. to achieve at least a 96% strength increase of the high-strength material within three hours.

According to another aspect, the high thermal conductivity material has a thermal conductivity of at least approximately 80 W m$^{-1}$ K$^{-1}$, and the precipitation hardened, high strength material has an ultimate tensile strength of at least approximately 2000 MPa, a yield strength of at least approximately 1950 MPa, or an endurance limit fatigue strength of at least approximately 850 MPa.

According to another aspect, the high thermal conductivity material is a beryllium-copper alloy and the high strength material is a maraging steel. In one example, the high thermal conductivity material contains approximately 0.2-0.6% Be and 1.4-2.2% Ni, with balance Cu, and the high strength material contains approximately 18.5% Ni, 7.5-12.0% Co, and 3.25-4.8% Mo, with balance Fe.

According to another aspect, the high thermal conductivity material and the high-strength material are integrally joined together by welding, such as by electron beam welding.

According to another aspect, the at least one increased strength aspect of the high strength material and the at least one increased strength aspect of the high thermal conductivity material each includes at least one of ultimate tensile strength, yield strength, and endurance limit fatigue strength.

Other features and advantages of the invention will be apparent from the following specification taken in conjunction with the following drawings.

BRIEF DESCRIPTION OF THE DRAWINGS

Certain exemplary embodiments of the present invention are described below with reference to the accompanying drawings in which.

The same reference number may be used in the various drawings to label the same, similar or generally corresponding components, features, etc.

DETAILED DESCRIPTION

Figure 1:
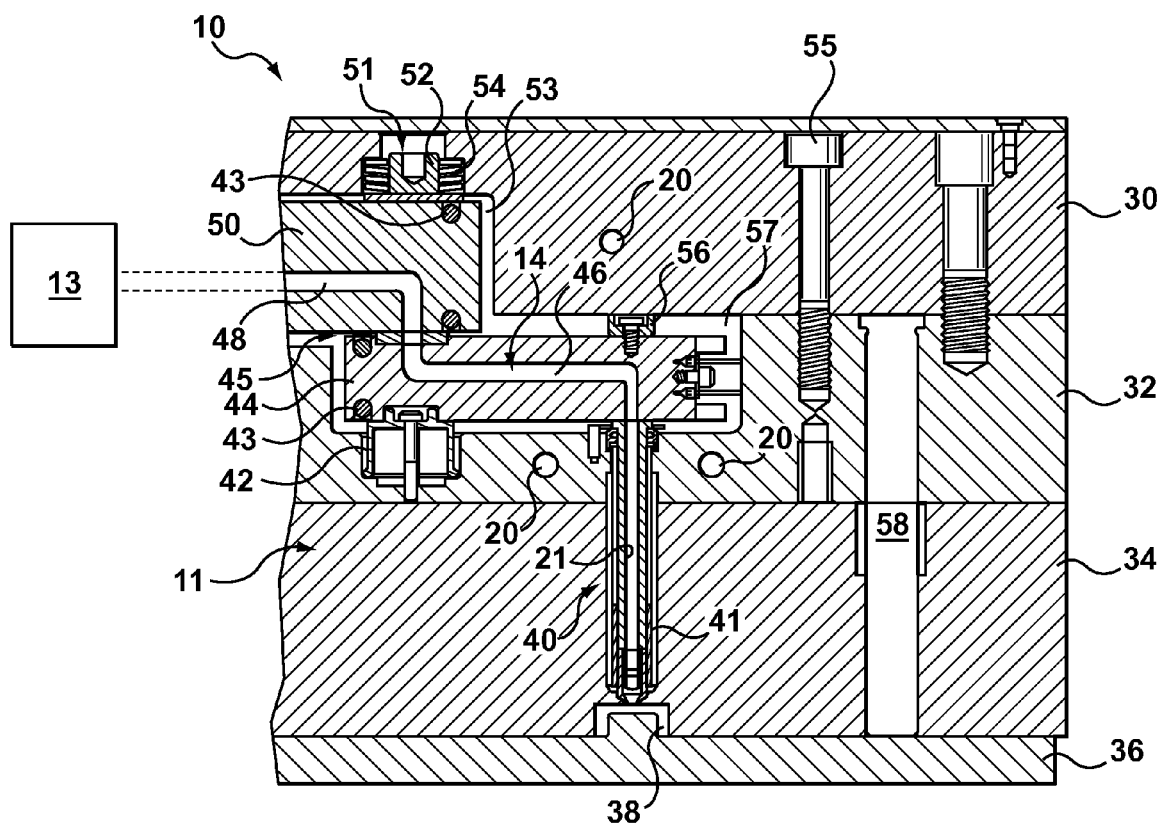
FIG. 1 is a cross-sectional view of a portion of one embodiment of an injection molding assembly, including a hot runner assembly.

While this invention is susceptible of embodiments in many different forms, there are shown in the drawings and will herein be described in detail certain exemplary embodiments of the invention with the understanding that the present disclosure is to be considered as an exemplification of the principles of the invention and is not intended to limit the broad aspect of the invention to the embodiments illustrated.

Generally, a composite material component for an injection molding assembly 10 is provided herein. The component includes a first portion formed of a precipitation hardened, high thermal conductivity material and a second portion formed of a precipitation hardened, high strength material, and the high thermal conductivity material and the high strength material are unitized or integrally joined together, e.g., by welding or other methods further described below. The thermal conductivity of the high thermal conductivity material is greater than the thermal conductivity of the high strength material. The strength of the high-strength material is greater than the strength of the high thermal conductivity material. The high thermal conductivity material and the high strength material can be precipitation hardened together under the same precipitation hardening conditions after being joined together to form part of or the entire composite component. Advantageously, through this precipitation hardening, both materials can achieve greater strength as compared to otherwise identical materials which have been annealed, but have not been precipitation hardened. As described in more detail below, many different composite components of the injection molding assembly 10 may be produced through the principles disclosed herein. In one embodiment, the component is a composite nozzle tip, generally referred to using reference numeral 16, for use with the injection molding assembly 10, as described further below.

Referring to FIG. 1, one embodiment of a hot runner system 11, which is a well-known component of an injection molding assembly 10 of the hot-tip style, is shown. The hot runner system 11 has a melt channel 14 extending therethrough, in fluid communication with an injection unit 13 adapted to contain a pressurized, flowable material, in a well known manner. A plurality of fasteners 55 rigidly affix a manifold plate 32 to a backing plate 30. A sub-manifold 44 is located in a cavity 57 formed in manifold plate 32. A spacer 56 is located between sub-manifold 44 and backing plate 30 to reduce thermal communication therebetween. In the embodiment shown, the spacer 56 is rigidly affixed to the sub-manifold 44 and is allowed to slide along a surface of the backing plate 30 thereby allowing thermal expansion. However, the spacer 56 could also be rigidly affixed to the backing plate 30 and allowed to slide along a surface of the sub-manifold 44. An insulator 42 is located between manifold plate 32 and sub-manifold 44 to maintain a space therebetween and reduce thermal communication. In the embodiment shown, the insulator 42 is inserted into a first hole located in sub-manifold 44 and extends into a second hole located in manifold plate 32 such that it inhibits relative motion between the sub-manifold 44 and the manifold plate 32 in the area of a sealing member 45. A bridge manifold 50 is located in a manifold cavity 53 formed in the backing plate 30. A plunger 51, preferably comprised of a plunger bushing 52 and a spring means 54, maintains a gap between bridge manifold 50 and backing plate 30 to reduce thermal communication therebetween. Heaters 43 supply heat to the components of the hot runner assembly 11.

A first melt channel segment 48 and a second melt channel segment 46 form portions of the melt channel 14 extending through the hot runner assembly 11. The first and second melt channel segments 48, 46 are located in a bridge manifold 50 and the sub-manifold 44 respectively, and are in fluid communication with each other. A sealing member 45 is inserted in a recess of the sub-manifold 44 and is aligned with the first melt channel segment 48 and the second melt channel segment 46. In one embodiment, the spring means 54 is comprised of a series of stacked Belleville springs to create a resilient spacer to adjust to thermal expansion of the various components. The spring means 54 can also be selected from the group consisting of a compression spring and a resilient material.

Nozzle assembly 40 has a nozzle melt channel segment 21 extending therethrough and forming a part of the melt channel 14. The nozzle melt channel segment 21 is in fluid communication with the second melt channel segment 46 for the communication of fluid to a mold cavity 38. In the embodiment shown, the nozzle assembly 40 has a heater 41, as is well known in the art to maintain material in the nozzle melt channel segment 21 in a flowable state. The heater 41 may be selected from the group consisting of a resistance heater, induction heater, heat pipe, thick film heater and a thin film heater. In the embodiment shown, the nozzle assembly 40 is located in the manifold plate 32 and extends through a cavity plate 34 to a gate or the cavity 38. The cavity plate 34 is aligned with the manifold plate 32 by at least one alignment pin 58, as is well known in the art. A core plate 36 is located in alignment with cavity plate 34 to form cavity 38 which defines the shape of the molded article to be produced.

Figure 2:
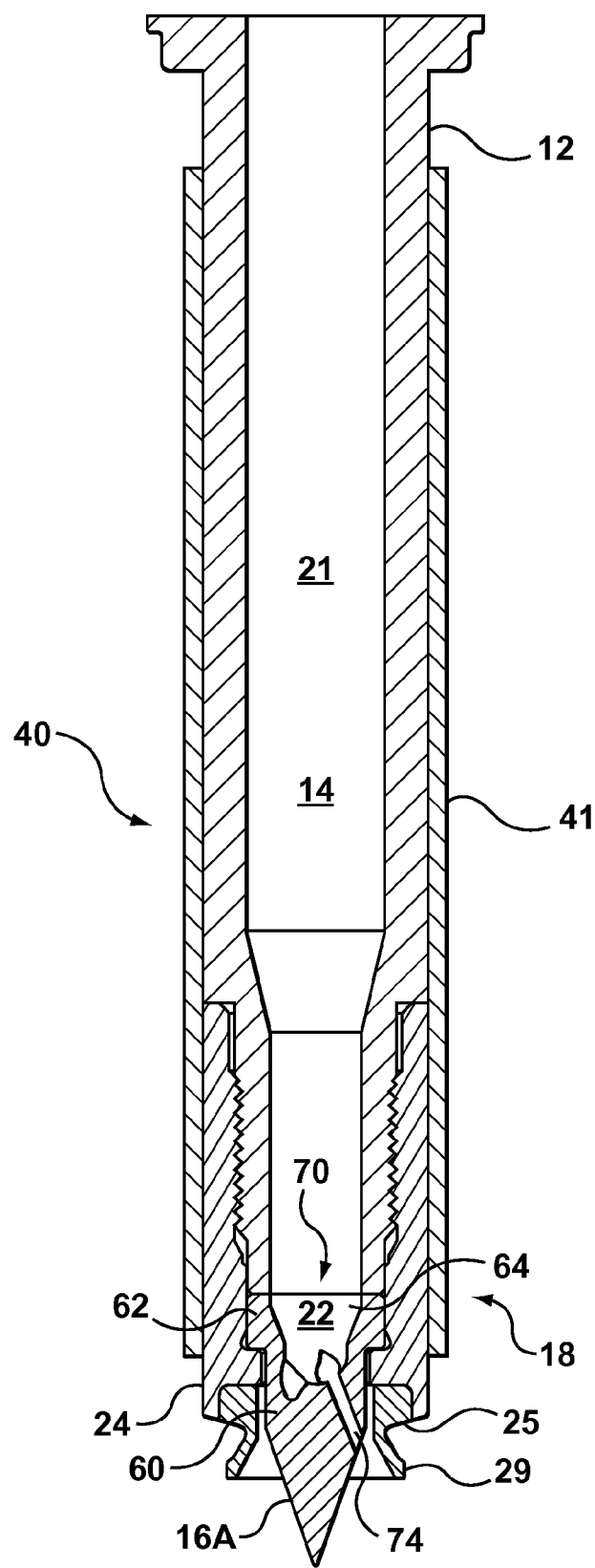
FIG. 2 is a cross-sectional view of one embodiment of a nozzle assembly for an injection molding assembly.
Figure 2A:
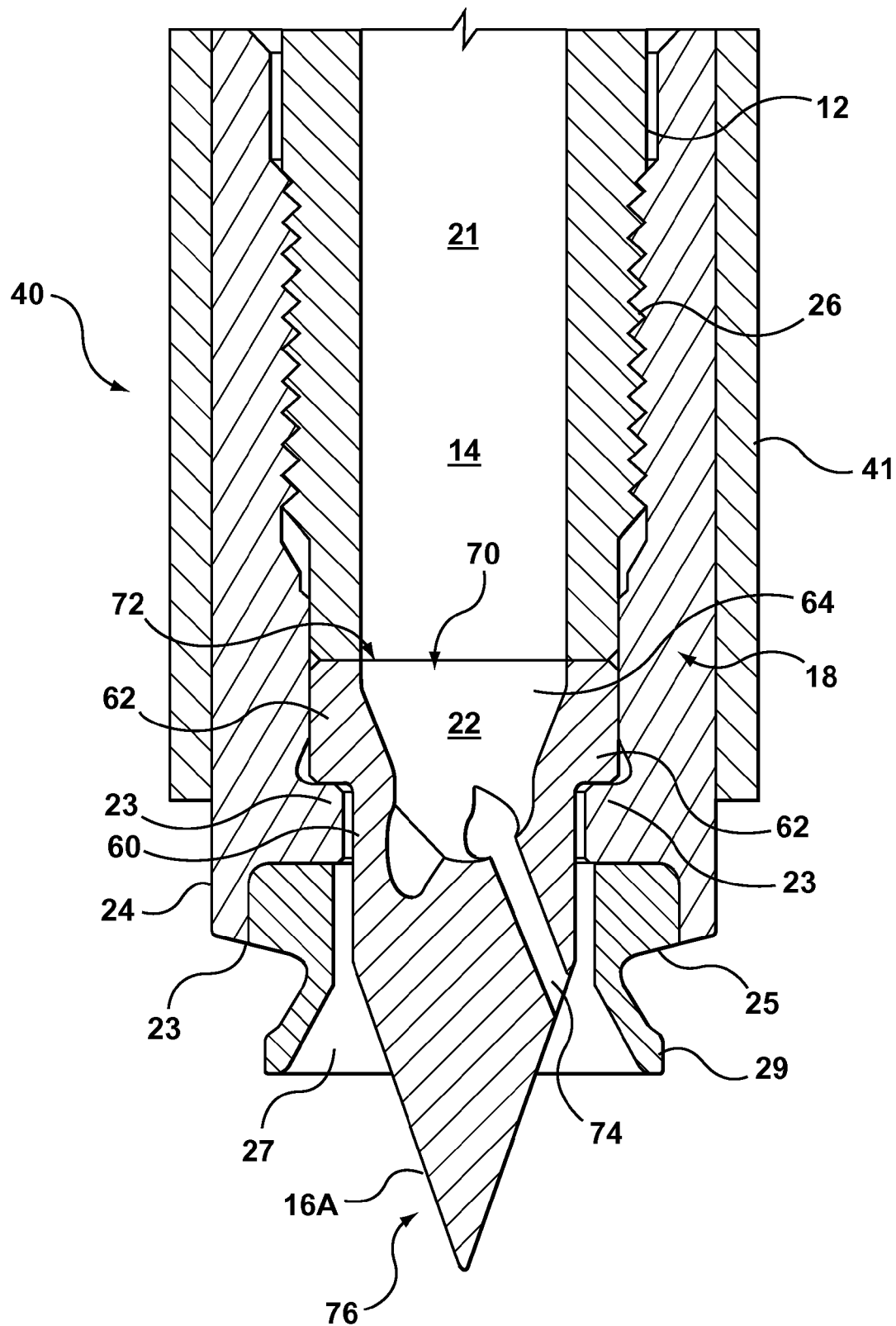
FIG. 2A is a focused view of a portion of the nozzle assembly of FIG. 2.

One embodiment of the nozzle assembly 40, which utilizes a composite nozzle tip 16A in accordance with this disclosure and is suitable for use in the assembly of FIG. 1, is illustrated in greater detail in FIGS. 2 and 2A. As shown, the nozzle assembly 40 comprises an elongated nozzle housing 12 having the nozzle melt channel segment 21 extending therethrough, forming part of the melt channel 14. The composite nozzle tip 16A is installed at the proximal end 18 of the nozzle housing 12 so that a tip channel segment 22 formed in nozzle tip 16A is in fluid communication with the melt channel 14 and has at least one outlet aperture 74 in fluid communication with the tip channel 22. In certain exemplary embodiments, nozzle tip 16A is retained at the proximal end 18 of nozzle housing 12 by a tip retainer 24 having distal surface 28 (See FIG. 3) and shoulder 23, one or both of which bear against an adjacent surface of the nozzle tip. Retainer 24 is removably affixed to a proximal end 18 of the nozzle housing by threads 26 or another connecting structure or feature. The tip retainer 24 is preferably configured to receive and retain the nozzle tip 16A when the tip retainer 24 is connected to the proximal end 18 of the nozzle housing 12. In the embodiment shown, the nozzle housing 12 and tip retainer 24 are constructed, arranged, and threaded such that the tip retainer 24 installs on external threads on the nozzle housing 12. In this embodiment, the nozzle housing 12 and tip retainer 24 are substantially cylindrical in cross section with substantially equal outside diameters, so that a substantially cylindrical external heater 41 can be installed over nozzle housing 12 and tip retainer 24. Heater 41 supplies heat to nozzle housing 12 and tip retainer 24 to keep the material in melt channel 14 and tip channel 22 molten.

Figure 3:
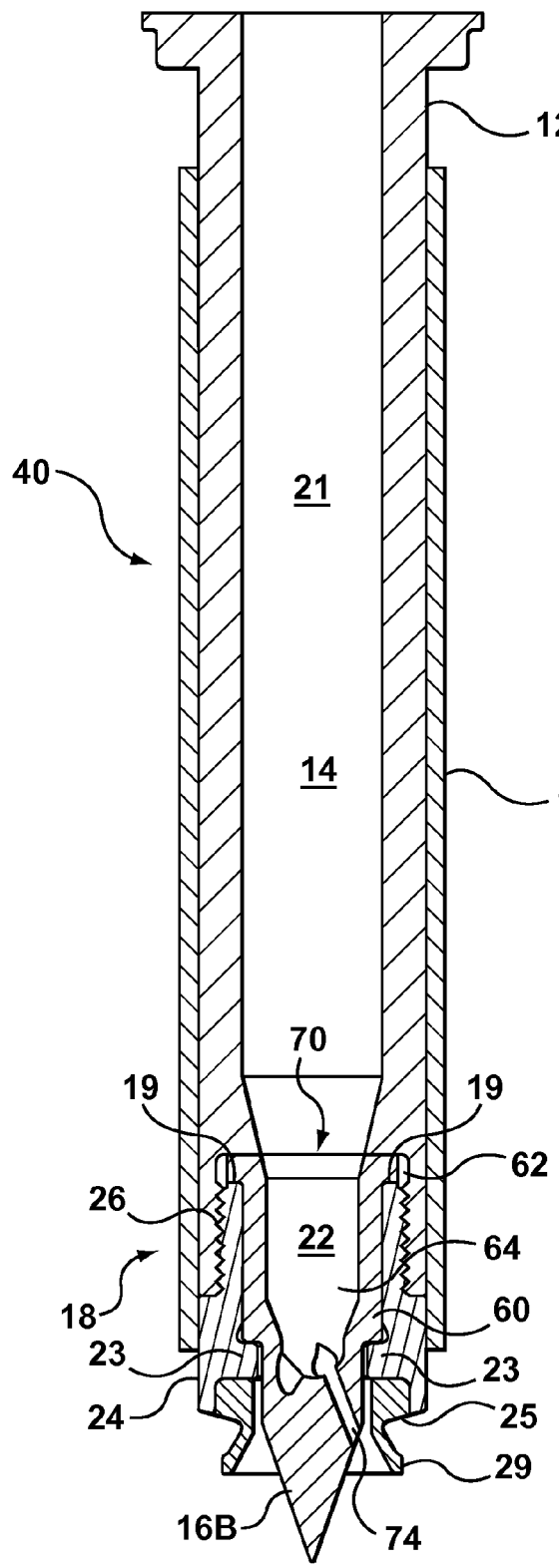
FIG. 3 is a cross-sectional view of another embodiment of a nozzle assembly for an injection molding assembly.

In another embodiment, shown in FIG. 3, the tip retainer 24 threads into internal threads in the nozzle housing. In this embodiment, the nozzle housing 12 and tip retainer 24 are configured with internal threads 26 in the nozzle housing 12 and mating external threads on the tip retainer 24. The tip retainer 24 installs in the internal threads 26 to retain the nozzle tip 16B. The tip retainer 24 has both a shoulder 23 and a distal surface 28 which engage and retain the nozzle tip 16B.

Figure 4:
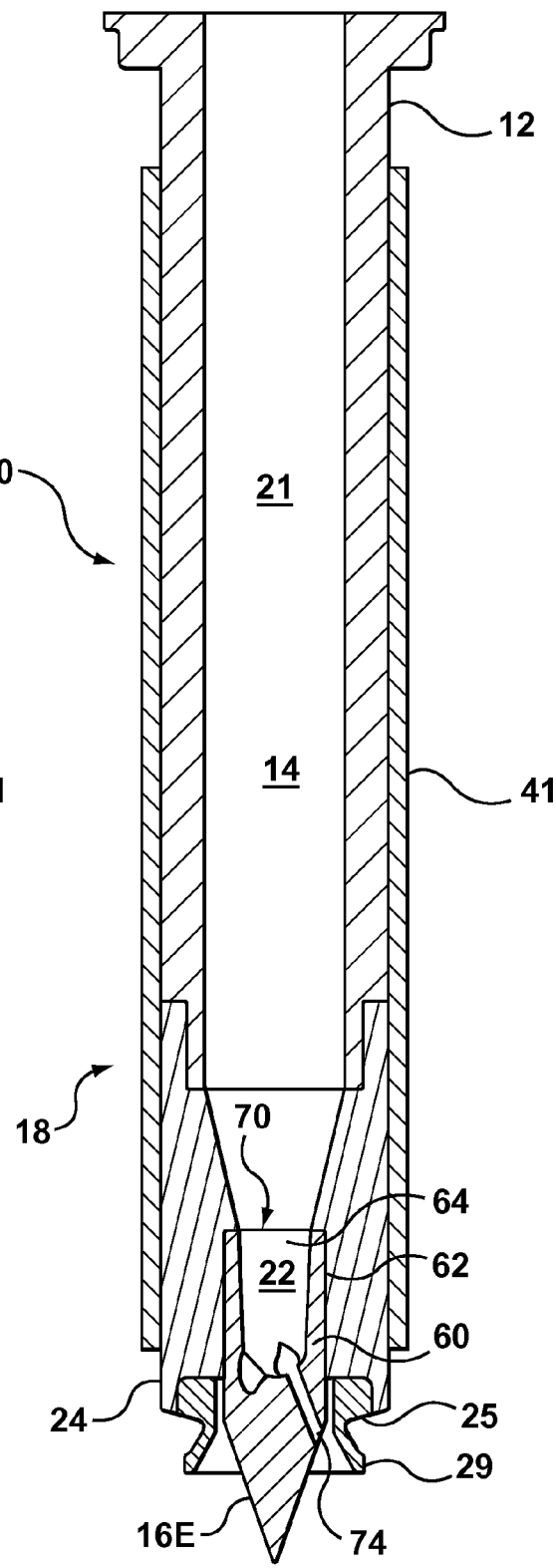
FIG. 4 is a cross-sectional view of a further embodiment of a nozzle assembly for an injection molding assembly.

In a further embodiment, shown in FIG. 4, the nozzle assembly 40 can be configured without a removable tip retainer 24. In this embodiment, the tip retainer 24 is integrally joined with the nozzle housing 12, such as by forming them of a single piece, or by welding, brazing, soldering, and similar methods. When made of a different material then that of the nozzle housing 12, the retainer portion 24 may be welded or brazed with high temperature brazing material to the nozzle housing 12. The nozzle tip 16E can be attached to the tip retainer 24 by brazing with a relatively low-temperature brazing material which would still allow nozzle tip 16E to be removed from tip retainer 24 by reheating the assembly to a temperature high enough to melt the low-temperature brazing material, but not so high as to melt the high temperature brazing material. Alternatively, the nozzle housing 12 and tip retainer 24 could be one integral piece made of the same material. In another example, the tip retainer 24 could have the tip 16E brazed or welded to it, and have tip retainer 24 threadably engage the nozzle housing 12. In still another example, the tip retainer 24 may be removably affixed to the nozzle housing 12 by a low-temperature brazed interface, and the tip retainer 24 may be configured to mechanically retain the nozzle tip 16E in similar fashion to that of the embodiment of FIG. 2. It must be recognized that, for the embodiments requiring brazing, temperatures high enough to melt even the low-temperature brazing material may be high enough to undesirably degrade the material properties of the tip retainer 24.

In all the embodiments above, an optional nozzle seal 25 is affixed to the proximal end of tip retainer 24, and has a flange 29 which contacts and seals against the mold (not shown). It should be noted, that one of ordinary skill in the art is familiar with a myriad of configurations for nozzle seals and the like that may include a bubble area 27 (FIG. 2A) formed between flange 29 and nozzle tip 16 where molten material is allowed to collect to enhance thermal insulation of the injection nozzle 10 from the mold. In certain exemplary embodiments, nozzle seal 25 is made of a lower thermal conductivity material than tip retainer 24 to minimize heat transfer between the retainer 24 and the mold (not shown). Nozzle seal 25 in certain exemplary embodiments is annularly spaced from the nozzle tip 16 to minimize the heat transfer between nozzle seal 25 and nozzle tip 16. One suitable material for nozzle seal 25 is a tool steel, which has a thermal conductivity of around 14 W m$^{-1}$ K$^{-1}$. Nozzle seal 25 in certain exemplary embodiments is fused to tip retainer 24 at interface 23 by electron-beam welding, brazing, or other such process. Alternatively, nozzle seal 25 may be made with a press fit at interface 23, or nozzle seal 25 may threadably engage tip retainer 24.

It is contemplated that all known configurations for nozzle assemblies may be used in accordance with the disclosed component and method. For example, although a nozzle tip 16 is disclosed with reference to a hot-tip style injection molding assembly, the principles disclosed herein can be used to provide a superior nozzle tip for a valve-gate style injection molding assembly.

Figure 5:
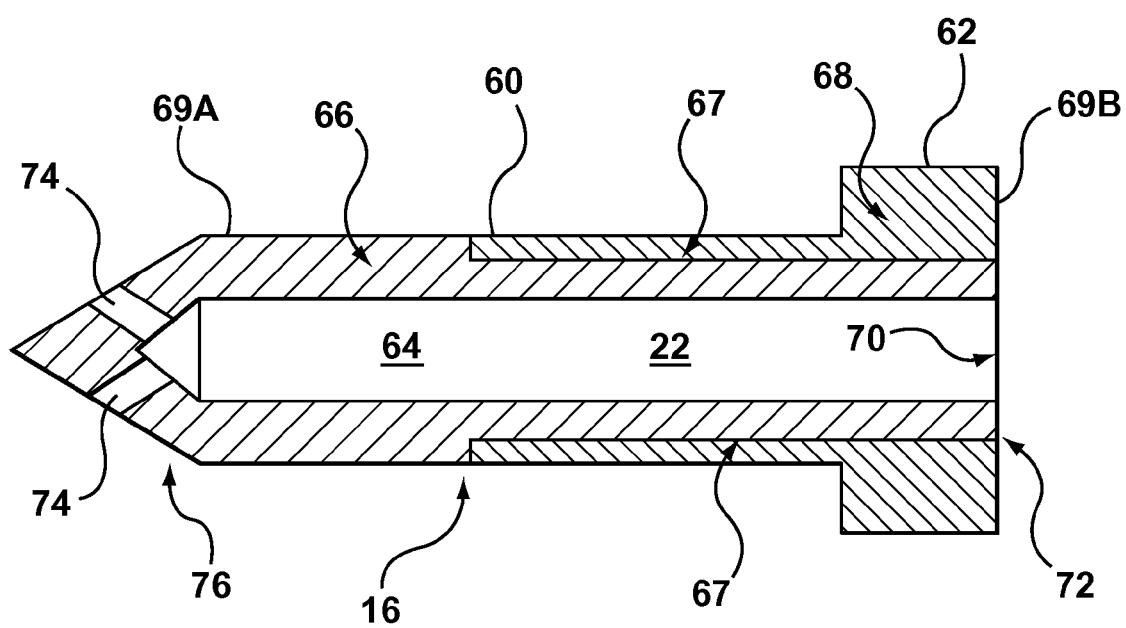
FIG. 5 is a cross-sectional view of one embodiment of a composite nozzle tip.
Figure 6:
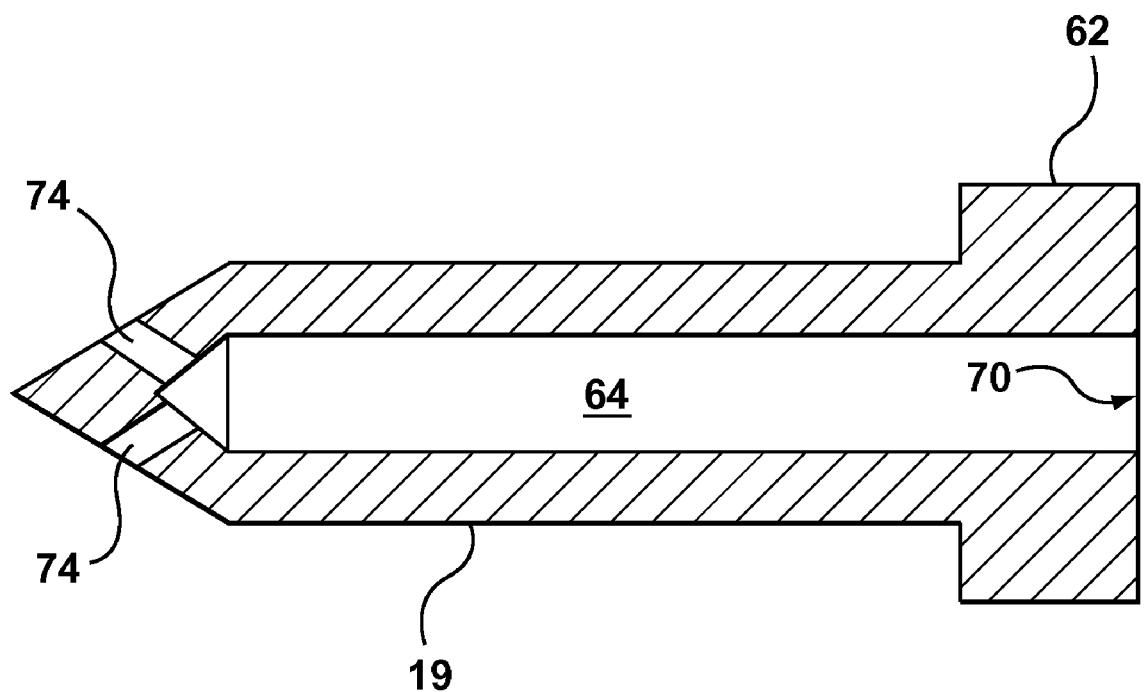
FIG. 6 is a cross-sectional view of a prior art nozzle tip.

A composite nozzle tip 16 in accordance with certain exemplary embodiments is illustrated in more detail in FIG. 5, which is suitable for use as the nozzle tips 16A-16E shown in FIGS. 2-4. As shown in FIG. 5, nozzle tip 16 has a body 60 having a connection member 62 adapted for connection to the injection molding assembly 10 and a bore 64 extending through the body 60. The body 60 is formed of materials including a precipitation hardened, high thermal conductivity material 66 and a precipitation hardened, high strength material 68, where the high thermal conductivity material 66 and the high strength material 68 are integrally joined together to form the body 60. In other words, the body 60 includes a first portion 66 and a second portion 68 integrally joined together to form the body 60, where the first portion 66 is formed of a precipitation hardened, high thermal conductivity material and the second portion is 68 formed of a precipitation hardened, high strength material. In general, the thermal conductivity of the high thermal conductivity material 66 is greater than the thermal conductivity of the high strength material 68, and the strength of the high strength material 68 is greater than the strength of the high thermal conductivity material 66. In contrast, a prior art nozzle tip 19 is illustrated in FIG. 6, constructed of a single material.

As stated above, the first portion 66 and the second portion 68 are integrally joined to form the body 60 of the nozzle tip 16. As used herein, integral joining is defined as including permanent or semi-permanent technique of joining two or more materials together, e.g., by integral structure, surface-to-surface joinder or other interface between them to create a single or unitized piece, as contrasted with mechanical joining techniques such as using only threads, fasteners or friction/press fit connections. Integral joining is found to provide advantageous performance the disclosed injection molding components for withstanding the high thermal and physical stresses and thermal and physical cycling experienced by such components. Such mechanical joining techniques can be used, however, in at least certain exemplary embodiments of the composite nozzle tips or other composite components disclosed here, in conjunction with (including as a part of) the aforesaid permanent or semi-permanent joinder. A non-exhaustive list of integral joining techniques includes: any of a large variety of welding techniques, brazing, soldering, and forming of a single piece, such as by molding or powder metallurgy. The variety of welding techniques referred to includes, without limitation, gas flame welding techniques; electric arc welding techniques; energy beam welding techniques, such as laser welding, electron beam (EB) welding, and laser-hybrid welding; resistance welding techniques, such as spot welding, shot welding, seam welding, flash welding, projection welding, and upset welding; and solid-state welding techniques, such as forge welding, friction/mechanical welding, ultrasound welding, explosion welding, co-extrusion welding, cold welding, diffusion welding, diffusion bonding, high frequency welding, hot pressure welding, induction welding, and roll welding. In the embodiment shown in FIG. 5, the first and second portions 66, 68 are joined using EB welding, creating a weld zone 67 between the portions 66, 68.

As shown in FIG. 5, the nozzle tip 16 is formed of two pieces 69. The tip 16 shown includes a connection member 62 adapted for connection to the injection molding assembly 10 and a bore 64 extending through the body 60. In the embodiment shown, the connection member 62 is a flange 62 extending around the periphery of the body 60. As shown in FIGS. 2-3, the tip 16 can be attached to the nozzle assembly 40 by the retainer 24, which grips and engages the flange 62. In other embodiments, the tip 16 may connect to the nozzle assembly 40 in a different manner, such as in the manner of the embodiment shown in FIG. 4 and described above. The bore 64 is generally a cylindrical passage through the center of the body 60 to form a tip channel segment 22, which is a portion of the melt channel 14. The bore 64 is in communication with the nozzle melt channel segment 21 through an inlet opening 70 at an inlet end 72, and is also in communication with at least one outlet aperture 74 at an outlet end 76. Accordingly, the flowable material flows into the bore 64 through the inlet opening 70, through the bore 64, and out of the bore 64 into the mold cavity 38 through the outlet aperture 74. Thus, the flowable material can flow from the injection unit 13 to the mold cavity 38.

In the embodiment illustrated in FIG. 5, the first portion 66, or high thermal conductivity material 66, forms the entire bore 64, as well as the outlet end 76 of the nozzle tip 16. It is contemplated that the high strength material 68 can advantageously be placed in positions where the most stress or force, e.g., tip-retaining force, is exerted on the nozzle tip 16 to absorb this stress. Frequently, high stresses are concentrated at or around the connection member 62, due to the forces necessary to seal the nozzle tip 16 to the nozzle assembly 40. Thus, in the embodiment of FIG. 5, the second portion 68, or high strength material 68, forms the entire flange 62 to absorb this stress and also forms a shell over the high thermal conductivity bore 64, 66 for at least a portion of the length of the bore 64 proximate the flange 62. In other embodiments, the high strength material 68 may be positioned around the bore 64 of the nozzle tip 16 and the high thermal conductivity material 66 may be positioned around the outside of the nozzle tip 16. In further embodiments, the inner and outer peripheries of the nozzle tip 16 may be formed from the high thermal conductivity material 66, and the high strength material 68 may form an inner "band" sandwiched between the two pieces of high thermal conductivity material 66. Other embodiments are contemplated where the high strength material 68 is positioned to absorb stresses on the nozzle tip 16 and the high thermal conductivity material 66 is positioned to conduct heat through the nozzle tip 16. Thus, in other embodiments, the configuration, placement, and proportions of the high thermal conductivity material 66 and the high strength material 68 can vary. Further, it is understood that the term "portion" is not necessarily considered to be synonymous with "piece," and does not imply that the entire portion 66, 68 is continuous throughout the nozzle tip 16. The pieces 69 referred to above are unitary pieces 69 which are used in the construction of the nozzle tip 16. One or both of the first and second portions 66, 68 may be formed from multiple pieces, and the composite nozzle tip 16 may contain two non-continuous areas of high thermal conductivity material 66 and/or high strength material 68. For example, the flange 62 and the outlet end 76 may be formed of high strength material 68, completely separated by a bridging piece of high thermal conductivity material 66. In such an embodiment, the nozzle tip 16 would be formed from three pieces, and the second portion 68 would comprise two pieces.

The high thermal conductivity material of the composite nozzle tips and other composite components disclosed here, e.g., for portions 66 in the illustrated nozzle tip embodiments, has a higher thermal conductivity than the high strength material. Thermal conductivity can be measured using standard ASTM E1530. Additionally, the high thermal conductivity material is hardenable by precipitation hardening, also known as aging or age hardening. Certain copper alloys, for example, provide high thermal conductivity and are precipitation hardenable to increase their strength. In certain exemplary embodiments, the high thermal conductivity material is a beryllium-copper alloy, such as an alloy made per any of the ASTM C17000 series specifications. BeCu3 (ASTM C17510), which contains approximately 0.2-0.6% Be and 1.4-2.2% Ni, with balance Cu (approximately 98%) is one such beryllium-copper alloy suitable for at least certain exemplary embodiments. BeCu25 (ASTM C17200), which contains approximately 1.8-2.0% Be, 0.2% min. Co+Ni, 0.6% max. Co+Ni+Fe, and 0.1% max. Pb, with balance Cu (approximately 97%), is another suitable beryllium-copper alloy. BeCu3 and BeCu25 are precipitation hardenable, for example, by aging as specified in ASTM Temper Code TF00. When used in at least certain exemplary embodiments of the nozzle tips disclosed herein, beryllium-copper alloys can provide the additional advantage of having a high thermal expansion coefficient, which creates better sealing of the nozzle tip 16. In certain embodiments another copper alloy or other high thermal conductivity, precipitation hardenable material may be used as the high conductivity material. It is contemplated that the composite component may include more than one high conductivity material. In certain exemplary embodiments, where the high conductivity material is BeCu3, the high thermal conductivity material has a thermal conductivity in the range of from 80-260 W m$^{-1}$ K$^{-1}$. In certain embodiments, the high thermal conductivity material has a thermal conductivity in the range of from 100-240 W m$^{-1}$ K$^{-1}$. By comparison, in at least certain such exemplary embodiments the high strength material has a thermal conductivity in the range of from 15-60 W m$^{-1}$ K$^{-1}$.

The high strength material used in a composite nozzle tip or other composite component in accordance with this disclosure, e.g., the material of portion 68 in the illustrated nozzle tip embodiments, has a higher strength than the high conductivity material of the component. Additionally, the high strength material is hardenable by precipitation hardening. High strength materials suitable for at least certain exemplary embodiments of the composite nozzle tips and other composite components disclosed here include, e.g., maraging steel alloys, which typically contain a substantial amount of iron and nickel, along with cobalt and/or titanium, provide high strength and are precipitation hardenable to further increase their strength. In certain exemplary embodiments, the high strength material is a maraging steel, such as an alloy made per the ASTM A538 specifications, for example, VascoMax® C300, which contains approximately 18.5% Ni, 9.0% Co, 4.8% Mo, 0.6% Ti, 0.1% Al, 0.1% max. Si, 0.1% max. Mn, 0.03% max. C, 0.01% max. S, 0.01% max. P, 0.01% Zr, and 0.003% B, with balance Fe (approximately 67%). Vasco-Max® C300 is precipitation hardenable by aging as described herein below. In other embodiments, another maraging steel or other high strength, precipitation hardenable material may be used as the high strength material, including another of the VascoMax® series of maraging steel alloys from Allegheny Technologies. Among the other available VascoMax® alloys that can be used in at least certain exemplary embodiments of the nozzle tips and other composite components disclosed here, are VascoMax® C200, C250, and C350, which generally contain approximately 18.5% Ni, 7.5-12.0% Co, and 3.25-4.8% Mo, with balance Fe and various trace elements, and cobalt-free titanium strengthened VascoMax® T200, T250, and T300, which generally contain approximately 18.5% Ni, 0.7-1.85% Ti, and 3.0-4.0% Mo, with balance Fe and various trace elements. It is contemplated that at least certain exemplary embodiments of the composite nozzle tips and other composite components disclosed here may include more than one high strength material.

As defined herein, strength is measured in any one of several ways. That is, the high strength material is stronger than the high thermal conductivity material of the same component in at least one strength aspect, and in certain exemplary embodiments is stronger in more than one strength aspect. For example, strength can be measured as ultimate tensile strength, which can be measured using standards ASTM E8 and ASTM E21. In certain exemplary embodiments, e.g., where the high strength material is one of the VascoMax® series of alloys, the ultimate tensile strength of the hardened high strength material at room temperature is at least 1400 MPa and up to at least 1500 MPa for VascoMax® C200, at least 1800 MPa and up to at least 1950 MPa for VascoMax® C250, at least 2000 MPa and up to at least 2200 MPa for VascoMax® C300, at least 2350 MPa and up to at least 2450 MPa for VascoMax® C350, at least 950 MPa and up to at least 1450 MPa for VascoMax® T200, at least 1200 MPa and up to at least 1800 MPa for VascoMax® T250, and at least 1150 MPa and up to at least 2050 MPa for VascoMax® T300. In certain other exemplary embodiments, strength is measured as 0.2% offset yield strength (referred to herein as simply "yield strength") using standards ASTM E8 and ASTM E21. In certain exemplary embodiments, e.g., where the high strength material is one of the VascoMax® series of alloys, the yield strength of the hardened high strength material at room temperature is at least 1350 MPa and up to at least 1450 MPa for VascoMax® C200, at least 1750 MPa and up to at least 1900 MPa for VascoMax® C250, at least 1950 MPa and up to at least 2150 MPa for VascoMax® C300, at least 2300 MPa and up to at least 2350 MPa for VascoMax® C350, at least 900 MPa and up to at least 1400 MPa for VascoMax® T200, at least 1100 MPa and up to at least 1750 MPa for VascoMax® T250, and at least 1050 MPa and up to at least 2000 MPa for VascoMax® T300. In certain exemplary embodiments strength is measured as endurance limit fatigue strength, which can be measured using standards ASTM E606 and ASTM E466. In certain exemplary embodiments, e.g., where the high strength material is one of the VascoMax® series of alloys, the endurance limit fatigue strength of the hardened high strength material at room temperature is at least 750 MPa for VascoMax® C200, C250, and C350, at least 850 MPa for VascoMax® C300, at least 750 MPa for VascoMax® T200 and T250, and at least 800 MPa for VascoMax® T300. By comparison, in the annealed condition, VascoMax® C200 has an ultimate tensile strength of 965 MPa and a yield strength of 689 MPa, VascoMax® C250 has an ultimate tensile strength of 965 MPa and a yield strength of 655 MPa, VascoMax® C300 has an ultimate tensile strength of 1034 MPa and a yield strength of 758 MPa, VascoMax® C350 has an ultimate tensile strength of 1138 MPa and a yield strength of 827 MPa, VascoMax® T200 has an ultimate tensile strength of 965 MPa and a yield strength of 689 MPa, VascoMax® T250 has an ultimate tensile strength of 965 MPa and a yield strength of 655 MPa, and VascoMax® T300 has an ultimate tensile strength of 1034 MPa and a yield strength of 758 MPa.

As stated above, both the high conductivity material and the high strength material of the composite nozzle tips and other composite components disclosed here are precipitation hardenable to increase their respective strengths. In certain exemplary embodiments the high thermal conductivity material and the high strength material are selected such that they can be precipitation hardened under the same precipitation hardening conditions. Precipitation hardening (also known as precipitation strengthening or age hardening/strengthening) is a well-known technique in the art of metallurgy for increasing the strength of a material. However, only a select number of materials can be precipitation hardened, including, for example, certain iron and copper alloys, as well as many aluminum and titanium alloys. Precipitation hardening is presently understood to rely on changes in solid solubility with temperature to produce particles of second phase within the metal matrix. These particles impede the movement of dislocations (defects) in a crystal's lattice. Movement of dislocations can allow the material to deform, so impeding the movement of these dislocations hardens and strengthens the material. The size and dispersion of these particles affects the amount of strengthening achieved through precipitation hardening, and the precipitation hardening conditions affect the size and dispersion of the particles. Materials precipitation harden only under certain conditions, including a certain temperature range. The material to be hardened typically is brought to a specific temperature, which is normally much greater than ambient temperature and is known as the aging temperature. The material is then held at the temperature for a predetermined time, known as the aging time, which allows the precipitate particles to form. Different materials having different compositions typically precipitation harden at different temperatures and rates. Thus, different materials often do not precipitation harden adequately under the same conditions. For example, when two incompatible materials are hardened together, one of the materials may overage, while the other is not aged enough, resulting in one or both of the materials obtaining less than desirable properties. Accordingly, materials for various embodiments of the composite nozzle tips or other composite components disclosed here should be selected in accordance with the forgoing principles.

Precipitation hardening generally increases the value of at least one strength aspect of the precipitation hardenable material relative to the same material in an unhardened condition, as described below, and can often increase the values of several strength aspects. Those skilled in the art would understand that the term "unhardened condition" refers to a material that has not been significantly strengthened through growth and/or dispersion of precipitates through an aging process, such as when the material is annealed and cooled in such a manner that precipitates do not form in significant concentration and size to significantly strengthen the material. It is also understood that, in the unhardened condition, the material may contain some precipitates and may experience minor strengthening as a result.

As described herein, during processing, the pieces or portions of the composite nozzle tips or other composite components disclosed here, e.g., pieces 69 used to construct the component of the illustrated nozzle tip embodiments, can be machined to the correct shape and then welded together to create the finished component or an intermediate product for the finished component. Both machining and welding are more easily and effectively done when the high strength material has been annealed prior to processing. Annealing softens the material, making it more machinable, and also relieves internal stresses in the materials, making cracking incident to welding less likely. Selecting the high thermal conductivity material and the high strength material such that they can be machined, joined and then together precipitation hardened under the same precipitation hardening conditions, is advantageous because it allows the component to be hardened in the assembled configuration. Thus, the pieces used to form the component can be machined and welded (or otherwise joined, as discussed above) while the high strength material is in the annealed condition, and then the entire component can be precipitation hardened after such assembly and joining. The high thermal conductivity material can also be annealed prior to machining, which is advantageous for certain materials. BeCu3 is easier to machine in a pre-hardened condition, because the softness of annealed BeCu3 can cause difficulties with machining. Additionally, BeCu3 can be precipitation hardened in the pre-hardened state without overaging, and thus, in some exemplary embodiments, a BeCu3 high thermal conductivity material is machined, assembled, and precipitation hardened starting from a pre-hardened condition. However, BeCu3 can also be machined, assembled, and hardened in the annealed condition. Other materials experience greater advantages by annealing prior to processing. For example, BeCu25 can overage if precipitation hardened in a pre-hardened condition, and thus, annealing prior to processing is advantageous for BeCu25.

When the materials are precipitation hardened together at the same conditions, both materials can achieve greater strength as compared to otherwise identical materials which have been annealed, but have not been precipitation hardened. In certain exemplary embodiments, both materials can exhibit at least 25% greater strength after precipitation hardening, as compared to otherwise identical materials which have been annealed, but have not been precipitation hardened. In certain other exemplary embodiments, both materials can exhibit at least 50% greater strength after precipitation hardening, as compared to otherwise identical materials which have been annealed, but have not been precipitation hardened. In certain other exemplary embodiments embodiment, both materials can exhibit at least 75% greater strength after precipitation hardening, as compared to otherwise identical materials which have been annealed, but have not been precipitation hardened. In certain other exemplary embodiments, both materials can exhibit at least 100% greater strength after precipitation hardening, as compared to otherwise identical materials which have been annealed, but have not been precipitation hardened. In further exemplary embodiments, one of the materials may exhibit a higher degree of strength increase than the other. For example, one material may achieve a strength increase of 75% while the other achieves a strength increase of 50%. As described above, the increase in strength can be an increase in at least one of yield strength, ultimate tensile strength, and endurance limit fatigue strength.

As noted above, in certain exemplary embodiments, the high conductivity material is a beryllium-copper alloy, such as BeCu3 or BeCu25, and the high strength material is a maraging steel, such as an alloy in the VascoMax® series. The optimum aging temperature for the alloys in the VascoMax® series is approximately 450° C. to 510° C., and VascoMax® T-Series alloys can be aged at approximately 315° C. to 540° C. By comparison, the optimum aging temperature for BeCu3 is approximately 480° C., and the optimum aging temperature for BeCu25 is approximately 260° C. to 425° C., and these materials can be adequately precipitation hardened at temperatures slightly outside the respective ranges. In one example, where the high thermal conductivity material is BeCu3 or BeCu25 and the high strength material is VascoMax® C300, both materials can be precipitation hardened, e.g., by heating for three hours to a temperature in the range of from approximately 315-540° C., preferably in the range of from approximately 425-510° C., and most preferably approximately 450° C. It is understood that the time and temperature for this aging may be adjusted as desired.

The degree of precipitation hardening is described below by way of an example. VascoMax® C300, which is a suitable high strength material for at least certain exemplary embodiments, has a yield strength of approximately 758 MPa and an ultimate tensile strength of approximately 1034 MPa in the annealed condition. In certain exemplary embodiments, the component, e.g., a nozzle tip 16, is formed from VascoMax® C300 and BeCu3, and the materials then are aged at 450° C. for three hours, resulting in the VascoMax® C300 achieving a yield strength of 1999 MPa (an increase of approximately 163%) and an ultimate tensile strength of 2027 MPa (an increase of approximately 96%), as well as an endurance limit fatigue strength of 862 MPa. In comparison, BeCu3 has an ultimate tensile strength of around 320 MPa and a yield strength of around 160 MPa in the annealed condition. When aged at 450° C. for three hours, BeCu3 can obtain an ultimate tensile strength of around 924 MPa (an increase of approximately 189%) and a yield strength of around 807 MPa (an increase of approximately 404%), as well as an endurance limit fatigue strength of around 340 MPa. When annealed at these same conditions, BeCu25 can obtain an ultimate tensile strength of around 1517 MPa, a yield strength of around 1344 MPa, and no endurance limit for infinite cycles. When precipitation hardened in the optimum range (450-510° C.), Vascomax® C300 can achieve a yield strength of up to at least 2166 MPa (an increase of approximately 186%) and an ultimate tensile strength of up to at least 2215 MPa (an increase of approximately 114%), with concurrent hardening also of the beryllium-copper alloy high thermal conductivity material.

In certain exemplary embodiments the high thermal conductivity material and the high strength material are precipitation hardened together at an aging temperature in the range of from 450° C. to 510° C., for up to 6 hours, to achieve at least a 96% yield strength increase, and up to a 195% yield strength increase, of the high strength material. In certain exemplary embodiments the high thermal conductivity material and the high strength material are precipitation hardened together at an aging temperature in the range of from 480° C. to 510° C., for up to 6 hours, to achieve at least a 104% yield strength increase, and up to a 195% yield strength increase, of the high strength material. In certain exemplary embodiments the high thermal conductivity material and the high strength material are precipitation hardened together at an aging temperature in the range of from 315° C. to 540° C., for up to 6 hours, to achieve at least a 36% yield strength increase, and up to a 195% yield strength increase, of the high strength material. In certain other exemplary embodiments the high thermal conductivity material and the high strength material are precipitation hardened together at an aging temperature in the range of from 425° C. to 480° C., for up to 6 hours, to achieve at least a 96% yield strength increase, and up to a 195% yield strength increase, of the high strength material. In comparison, BeCu3 can be hardened at these conditions to achieve a yield strength increase of up to at least 404%, and an ultimate tensile strength increase of up to at least 189%.

It is understood that, while the high thermal conductivity material and the high strength material in the finished component may be precipitation hardened under specific conditions and exhibit measurable properties, the above description is with regard to the general properties of the materials selected, and not necessarily in all embodiments with regard to the characteristics of the finished product. In other words, the above description refers to the ability of the selected materials to be precipitation hardened to achieve the stated properties, and not necessarily in all embodiments to whether the selected materials actually are processed in this manner or achieve the stated properties. Further, description of the high thermal conductivity material and the high strength material of a composite component as being precipitation hardenable together (or as being precipitation hardenable together under certain specified conditions) is a description of the precipitation hardening properties of the materials in the unhardened state. Thus, even if the materials are already precipitation hardened, they may be described here as being precipitation hardenable together (or as being precipitation hardenable together under certain specified conditions) if they would be precipitation hardenable together if they were in the unhardened condition. The claims below should be interpreted in this manner as well, unless clearly stated otherwise.

In producing the component disclosed herein, a first portion formed of a high thermal conductivity material 66 and a second portion formed of a high strength material 68 must first be provided. In one embodiment, the first and second portions 66, 68 are machined to the proper shapes from bar stock. In the nozzle tip 16 shown in FIG. 5, the first portion 66 constitutes a first piece 69A and the second portion 68 constitutes a second piece 69B, which are both machined to create the body 60 having the flange 62 and the bore 64. As described above, annealing prior to machining softens the material and increases the machineability thereof. Accordingly, in one embodiment, at least one of the first portion 66 and the second portion 68 is annealed prior to machining. VascoMax® C300 and other VascoMax® alloys, which are suitable high strength materials 68, can be purchased in pre-annealed form. Generally, VascoMax® C300 can be annealed at 830° C. for 1 hour per inch of thickness to relieve stresses and soften the material.

In certain exemplary embodiments, the high thermal conductivity material may not be annealed prior to processing, and may instead be provided in a pre-hardened condition. In accordance with the principles disclosed here, however, the high thermal conductivity material still would have the material property of being precipitation hardenable from an unhardened state to a hardened state under conditions applicable to precipitation hardening of the high strength material with which it is integral in the component The pre-hardened high thermal conductivity material is provided with increased strength relative to an unhardened condition. However, it is preferable that the high thermal conductivity material does not overage during precipitation hardening of the nozzle tip 16. Accordingly, in some exemplary embodiments, the high thermal conductivity material at least substantially maintains this increased strength during the precipitation hardening. It is understood that, in some embodiments, the pre-hardened high thermal conductivity material may suffer decreased strength during the aging process, yet still substantially maintain the increased strength provided by the pre-hardening. In one exemplary embodiment, the pre-hardened high thermal conductivity material maintains at least 90% of the increased strength relative to the unhardened condition. In another exemplary embodiment, the pre-hardened high thermal conductivity material maintains at least 75% of the increased strength relative to the unhardened condition. In one exemplary embodiment, the pre-hardened high thermal conductivity material maintains at least 50% of the increased strength relative to the unhardened condition. In one exemplary embodiment, the pre-hardened high thermal conductivity material maintains at least 25% of the increased strength relative to the unhardened condition. It is also understood that, in some embodiments, in substantially maintaining the increased strength, the pre-hardened high thermal conductivity material may achieve a further strength increase relative to both the unhardened and pre-hardened conditions during the aging process. BeCu3, which is a suitable high thermal conductivity material 66, is typically pre-hardened prior to machining, as stated above. The pre-hardening can include fully or near-fully hardening the material, such as by aging at 450° C. for three hours, or partially hardening the material, for example, by decreasing the aging time or adjusting the aging temperature. Alternately, the BeCu3 can be annealed at the same conditions as VascoMax® C300 to relieve stresses and soften the material. In additional embodiments, the first and second portions 66, 68 can be formed in different ways, such as by molding, powder metallurgy, or other techniques known in the art.

In certain exemplary embodiments, once the high thermal conductivity material portion and the high strength material portion are formed in the proper shapes, they are integrally joined using one of the techniques described above. For the nozzle tip 16 shown in FIG. 5, the two pieces 69 can be press-fit together prior to joining. In certain exemplary embodiments, the first and second portions are joined using electron beam ("EB") welding. Annealing prior to processing, as described above, also provides benefits in welding the high thermal conductivity material and the high strength material together, such as reducing or preventing cracking caused by the heat and resultant stresses of welding. BeCu3, listed above as a suitable high conductivity material for at least certain exemplary embodiments, can benefit from annealing prior to welding, but such annealing is not necessary. For VascoMax® C300 and other VascoMax® alloys, listed above as suitable high strength materials for at least certain exemplary embodiments, annealing prior to welding typically is important, because there is a significant risk of cracking when welding VascoMax® C300 in a hardened condition. Certain other integral joining techniques may benefit from annealing prior to further processing as well.

Optionally, in at least certain exemplary embodiments the composite nozzle tip or other composite component disclosed here may be annealed again after the high thermal conductivity material and the high strength material portions are joined. Some joining techniques, such as welding, can leave residual stresses in and around the heat-affected zone (HAZ) of the weld. Annealing can relieve these stresses, producing a part having more uniform stress distribution and a lower risk of cracking during use. This post-joining anneal can be generally performed as described above for the pre-joining anneal.

After joining the high thermal conductivity material portion(s) and the high strength material portion(s) of the component, they are precipitation hardened as described above. This precipitation hardening strengthens the high strength material and the high thermal conductivity material, providing beneficial properties in the finished component. In embodiments where the high thermal conductivity material is pre-hardened, the high strength material is strengthened through the precipitation hardening, and the high thermal conductivity material at least substantially maintains its increased strength relative to the unhardened condition.

After the component is precipitation hardened, it can be finish-machined to achieve desired tolerances and further shaping of the component, and/or to achieve a desired finish on the surface of the component.

In certain exemplary embodiments the precipitation hardened component optionally can then be partially or completely coated with a coating (including surface treatments in the nature of a coating), e.g., to improve resistance to wear and corrosion. One such desirable coating for at least certain embodiments is titanium nitride (TiN), which provides excellent resistance to wear and corrosion. Since titanium nitride can present adhesion problems, the component can be plated via electroless nickel plating (ENP), which allows the titanium nitride to adhere well to the component. After plating, the titanium nitride coating can be created using known techniques. In certain exemplary embodiments, the titanium nitride coating can be created by physical vapor deposition (PVD), which provides an effective coating and operates at an acceptably low temperature so the properties of the high thermal conductivity material and the high strength material are not significantly adversely affected. In certain other embodiments, other techniques could be used, such as chemical vapor deposition (CVD).

The operation and benefits of at least certain exemplary embodiments of the composite nozzle tips and other composite components disclosed here are now described with reference to composite nozzle tips such as nozzle tips 16, e.g., the embodiment illustrated in FIG. 5, used in a hot runner system 11, such as that shown in FIG. 1, and an injection molding nozzle assembly 40, as shown in FIGS. 2 and 2A. Material to be molded, for example a polymer, is melted and fed into the hot runner system 11. The molten material flows through the hot runner system 11 via the melt channel 14, and flows into and through the nozzle assembly 40. In the nozzle assembly 40, the heater 41 directly heats the nozzle housing 12 and the tip retainer 24, which transfer heat to the nozzle tip 16 and the molten material in the melt channel 14 and the tip channel 22. As discussed above, enough heat must be supplied to the nozzle tip 16 to open the gate at the beginning of the injection cycle and keep it open during the injection process. The tip 16 must not be so hot that it does not allow the gate to freeze after packing is complete. The high thermal conductivity material of the nozzle tip 16 assists in controlling the heat of the nozzle tip 16. The nozzle tip 16 is positioned at the gate of the mold cavity 38, and the molten material is injected from the nozzle tip 16 into the mold cavity 38. The mold cavity 38 is typically cooled, which causes the material to freeze quickly. The flow of material from the nozzle tip 16 stops when the gate is cooled and freezes. The high thermal conductivity material of the nozzle tip 16 also assists in controlled freezing of the gate proximate the tip 16.

Suitable embodiments of composite nozzle tips and other composite components in accordance with this disclosure can provide beneficial results when incorporated into a hot runner system for an injection molding assembly. For example, nozzle tip 16 provides excellent thermal conductivity, enhancing its ability to open and close the mold gate during injection molding operations. The composite structure of the nozzle tip 16 also results in greater strength relative to certain prior existing nozzle tips, and provides an advantageous combination of strength and thermal conductivity. For example, at least certain previous nozzle tips could only be used at pressures of up to 26 ksi (179 MPa). Suitable embodiments of the nozzle tip 16 disclosed above can be used at pressures of 35-40 ksi (241-275 MPa). Additionally, selecting the high thermal conductivity material and the high strength material to be precipitation hardenable together facilitates manufacturing of the multi-piece nozzle tip. In particular, the pieces 69 used to form the tip 16 can be machined and joined in a softened, annealed condition and then precipitation hardened after assembly.

Figure 7:
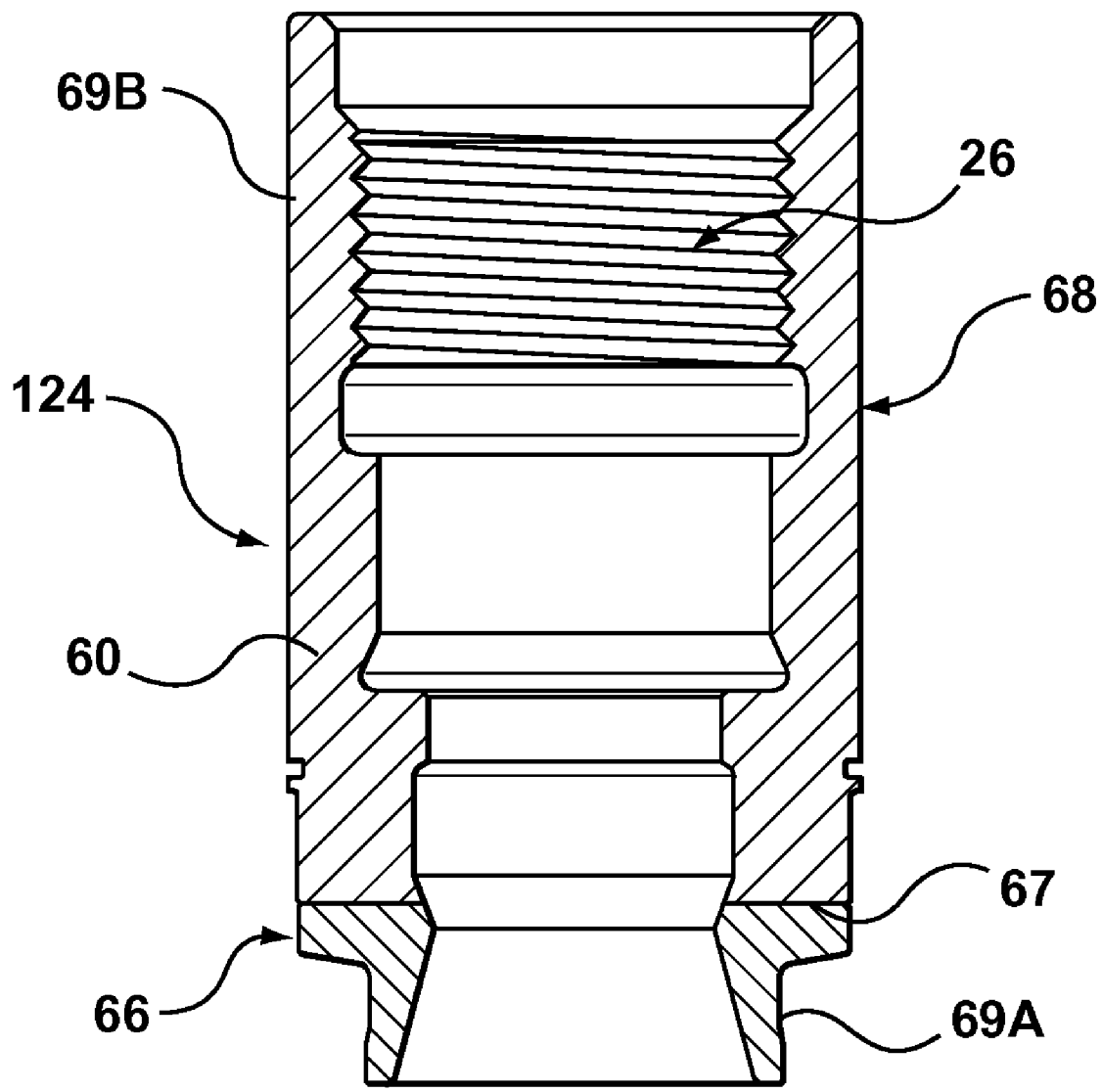
FIG. 7 is a cross-sectional view of one embodiment of a composite retainer.

While the composite component is described above by way of example as a nozzle tip 16 for a hot runner assembly 11, other components of an injection molding assembly can benefit from the composite construction and processing method described herein. For example, FIG. 7 shows a composite nozzle tip retainer 124, similar in structure and function to the nozzle tip retainers 24 shown in FIGS. 1-4 and described above. The retainer 124 has a body 60 having threads 26 adapted for connection to a nozzle assembly 40, the body 60 comprised of a first portion formed of a high thermal conductivity material 66 and a second portion formed of a high strength material 68, which are integrally joined together as described above. Like the composite nozzle tip 16 described above, the composite retainer 124 illustrated in FIG. 7 is manufactured from two pieces 69A, 69B, having one piece 69A constituting the portion formed of high thermal conductivity material 66 and the other piece 69B constituting the second portion formed of high strength material 68, and can be manufactured using the methods described above. Also like the nozzle tip 16, the retainer 124 can be designed or arranged differently, including being manufactured from a different number of pieces 69. In this arrangement, the retainer 124 will benefit from enhanced thermal conductivity around the nozzle tip and enhanced strength and greater insulative properties near the mold gate 38.

Figure 8:
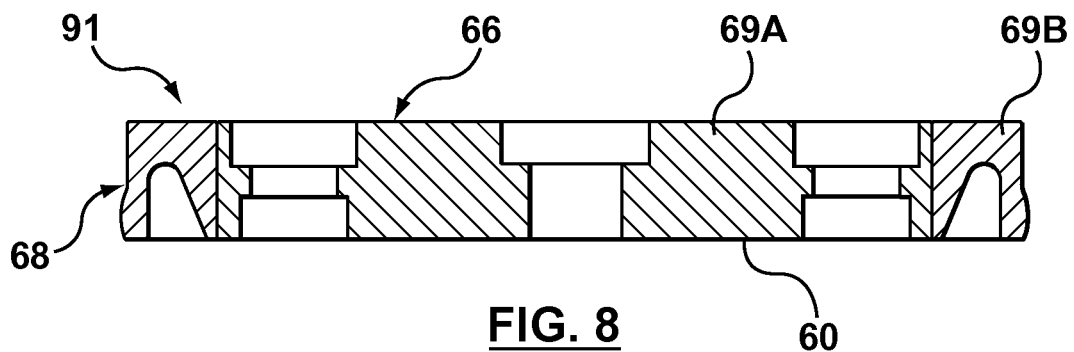
FIG. 8 is a cross-sectional view of one embodiment of a composite retainer plate.
Figure 9:
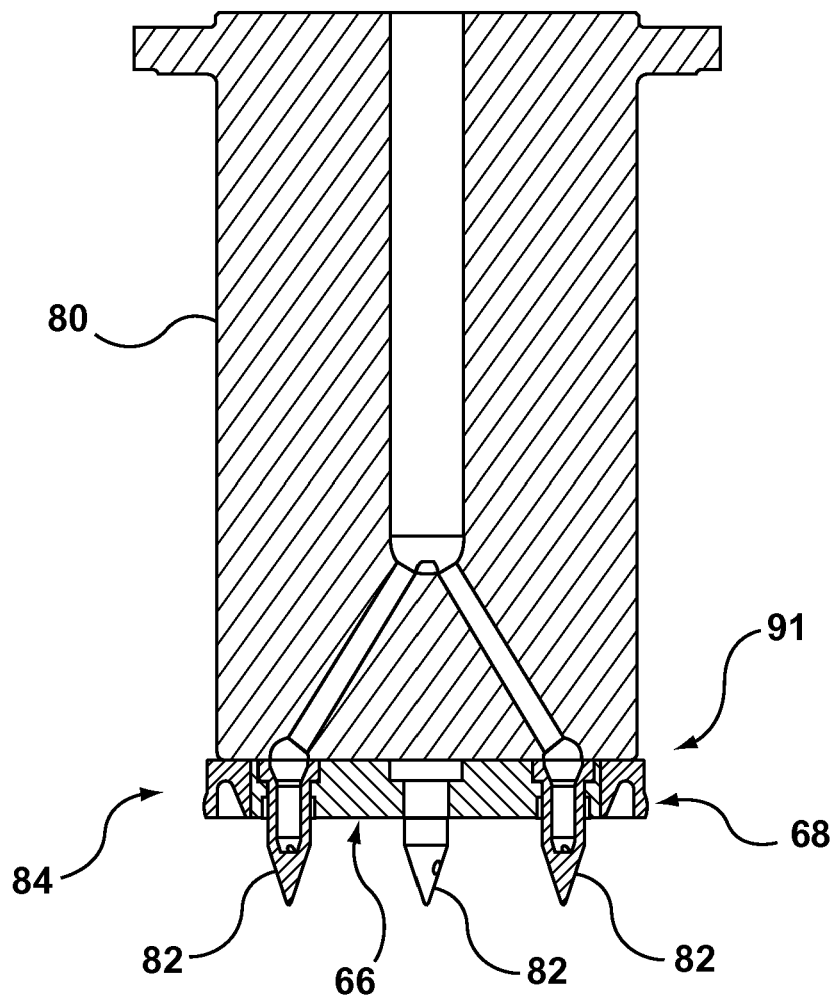
FIG. 9 is a cross-sectional view of a multi-probe nozzle assembly incorporating the retainer plate of FIG. 8.

In another example, FIG. 8 shows a composite retainer plate 91 for a multi-probe nozzle assembly 84 such as that illustrated in FIG. 9. The multi-probe nozzle assembly 84 has a multi-probe nozzle body 80 and a plurality of nozzle tips 82 retained against the nozzle body 80 by a retainer plate 91. The retainer plate 91 has a body 60 comprised of a first portion formed of a high thermal conductivity material 66 and a second portion formed of a high strength material 68, which are integrally joined together as described above. Like the composite nozzle tip 16 described above, the composite retainer plate 91 is manufactured from two pieces 69A, 69B, having one piece 69A constituting the first portion formed of high thermal conductivity material 66 and the other piece 69B constituting the second portion formed of high strength material 68, and can be manufactured using the methods described above. Also like the nozzle tip 16, the retainer plate 91 can be designed or arranged differently, including being manufactured from a different number of pieces 69. In this arrangement, the retainer plate 91 will benefit from enhanced thermal conductivity near the nozzles 82 and enhanced strength in a sealing-ring configuration around the exterior of the retainer plate 91.

Figure 11:
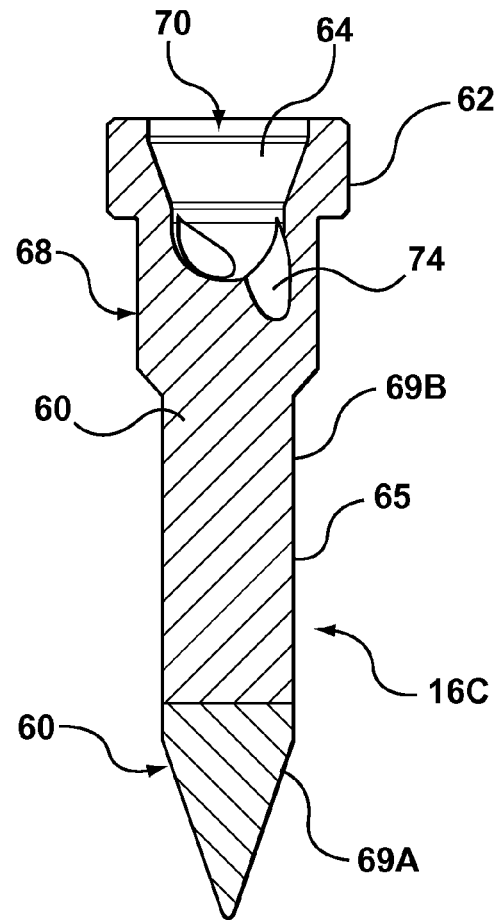
FIG. 11 is a cross-sectional view of the composite nozzle tip of FIG. 10.
Figure 10:
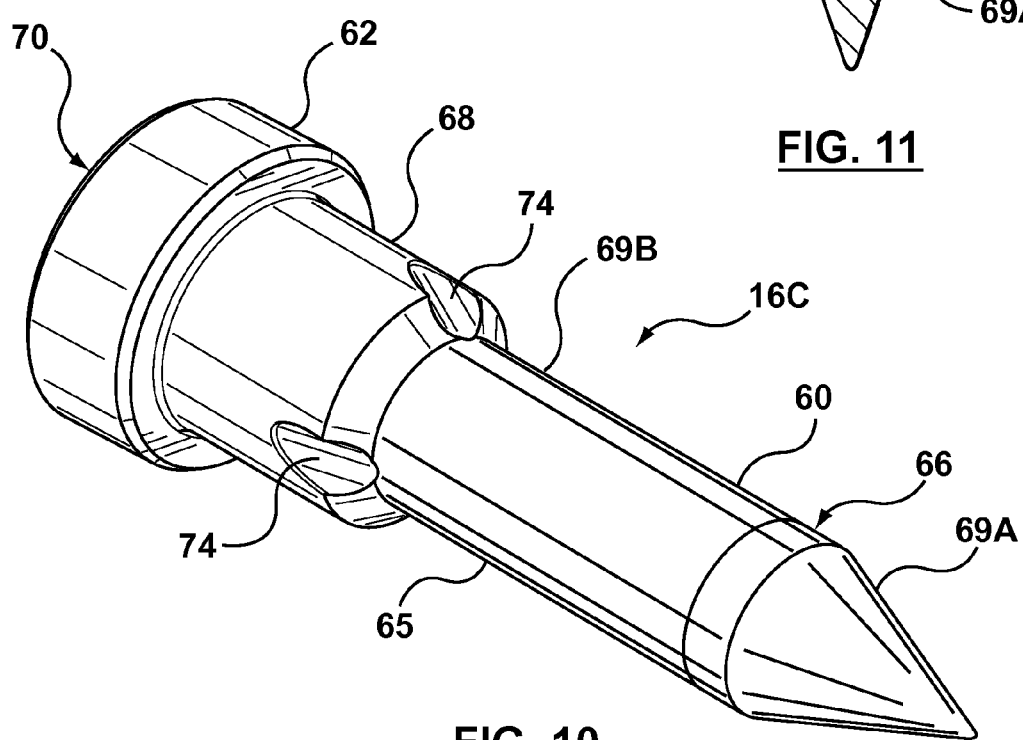
FIG. 10 is a perspective view of another embodiment of a composite nozzle tip.

Another embodiment of a nozzle tip 16C is illustrated in FIGS. 10-11. The nozzle tip 16C has a body 60 comprised of a first portion formed of a high thermal conductivity material 66 and a second portion formed of a high strength material 68, which are integrally joined together as described above. A weld zone 67 is indicated between the portions 66, 68 in FIG. 11. The nozzle tip 16C has a body 60 comprised of a flange 62 and a bore 64, and also has a substantial extension piece 65 below the outlet openings 74 of the tip 16C. As illustrated in FIG. 11, the second portion formed of the high strength material 68 comprises the entire bore 64 and flange 62, as well as a portion of the extension piece 65, and the first portion formed of the high thermal conductivity material 66 forms only the end of the extension piece 65. Like the composite nozzle tip 16 described above, the nozzle tip 16C is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the nozzle tip 16C can be designed or arranged differently, including being manufactured from a different number of pieces 69. In this arrangement, the nozzle tip 16C will benefit from enhanced thermal conductivity near the mold gate and enhanced strength in the sealing region of the tip 16C.

Figure 12:
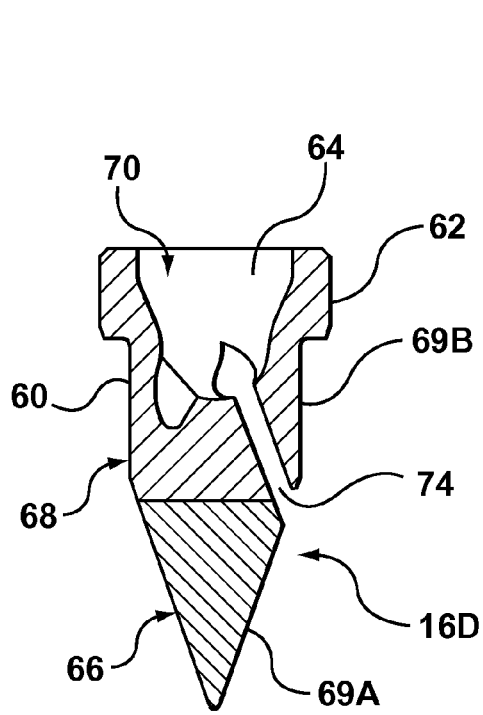
FIG. 12 is a cross-sectional view of a further embodiment of a composite nozzle tip.

A further embodiment of a nozzle tip 16D is illustrated in FIG. 12. The nozzle tip 16D has a body 60 comprised of a first portion formed of a high thermal conductivity material 66 and a second portion formed of a high strength material 68, which are integrally joined together as described above. The nozzle tip 16D has a flange 62 and a bore 64. As illustrated in FIG. 12, the second portion formed of the high strength material 68 comprises the entire bore 64 and flange 62, and the first portion formed of the high thermal conductivity material 66 forms only the very tip of the nozzle tip 16D. Like the composite nozzle tip 16 described above, the nozzle tip 16D is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the nozzle tip 16D can be designed or arranged differently, including being manufactured from a different number of pieces 69. In this arrangement, the nozzle tip 16D will benefit from enhanced thermal conductivity near the mold gate and enhanced strength in the sealing region of the tip 16D.

Figure 18:
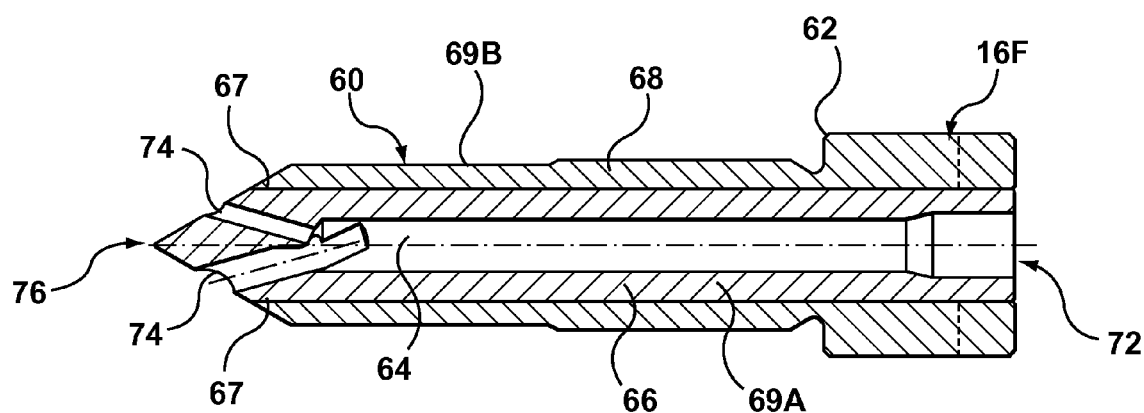
FIG. 18 is a cross-sectional view of another embodiment of a composite nozzle tip.

FIG. 18 illustrates another embodiment of a nozzle tip 16F. The nozzle tip 16F has a body 60 comprised of a first portion formed of a high thermal conductivity material 66 and a second portion formed of a high strength material 68, which are integrally joined together as described above. The nozzle tip 16F has a body 60 comprised of a flange 62 and a bore 64 that leads to two outlet openings 74 near the end 76 of the tip 16F. As illustrated in FIG. 18, the first portion formed of the high thermal conductivity material 66 surrounds the entire bore 64 of the tip 16F, and the second portion formed of the high strength material 68 comprises the flange 62 and forms a shell around the high thermal conductivity material 66 extending substantially the entire length of the tip 16F, nearly to the outlet end 76. Like the composite nozzle tip 16 described above, the nozzle tip 16F is manufactured from two pieces 69A, 69B, having one piece 69A constituting the portion formed of high thermal conductivity material 66 and the other piece 69B constituting the portion formed of high strength material 68, and can be manufactured using the methods described above. In the embodiment shown in FIG. 18, the two pieces 69A, 69B may be integrally joined by welding only at an area proximate to the outlet end 76, shown by weld zones 67. Because the pieces 69A, 69B are not joined at the inlet end 72, greater freedom for thermal expansion at that end 72 is permitted. Also like the nozzle tip 16, the nozzle tip 16F can be designed or arranged differently, including being manufactured from a different number of pieces 69, or by integrally joining in another manner. In this arrangement, the nozzle tip 16F will benefit from enhanced thermal conductivity near the mold gate and around the bore 64 and enhanced strength in the sealing region of the tip 16F.

Figure 19:
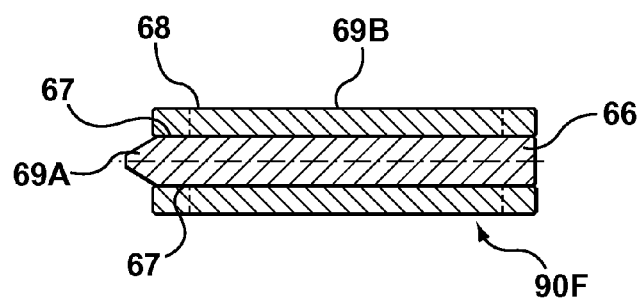
FIG. 19 is a cross-sectional view of a blank from which the composite nozzle tip of FIG. 18 is manufactured.

FIG. 19 illustrates a blank 90F used in manufacturing the nozzle tip 16F shown in FIG. 18. The blank 90F is comprised of a first piece 69A constituting the portion formed of high thermal conductivity material 66 and a second piece 69B constituting the portion formed of high strength material 68. As described above, the pieces 69A, 69B are machined to desired shapes and dimensions and are then integrally joined together, such as by EB welding, to form the blank 90F shown in FIG. 19. This EB welding creates weld zones 67 between the pieces 69A, 69B, as described above. The blank 90F is then finish machined to create the shape of the nozzle tip 16F shown in FIG. 18, including creating the bore 64 and outlet openings 74 in the body 60.

Figure 20:
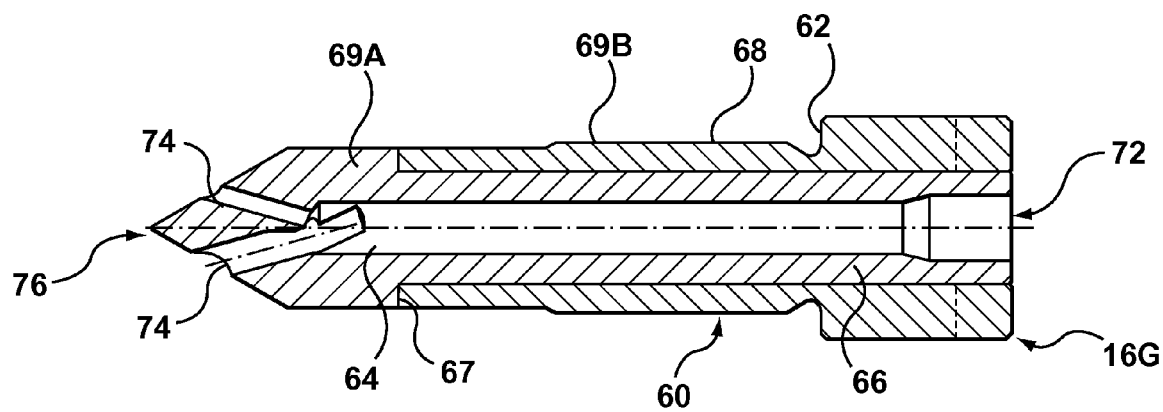
FIG. 20 is a cross-sectional view of another embodiment of a composite nozzle tip.

FIG. 20 illustrates another embodiment of a nozzle tip 16G. The nozzle tip 16G has a body 60 comprised of a first portion formed of a high thermal conductivity material 66 and a second portion formed of a high strength material 68, which are integrally joined together as described above. The nozzle tip 16G has a body 60 comprised of a flange 62 and a bore 64 that leads to two outlet openings 74 near the end 76 of the tip 16G. As illustrated in FIG. 20, the first portion formed of the high thermal conductivity material 66 surrounds the entire bore 64 and forms the outlet end 76 of the tip 16G, and the second portion formed of the high strength material 68 comprises the flange 62 and forms a shell around the high thermal conductivity material 66 extending slightly less than the entire length of the tip 16G. Like the composite nozzle tip 16 described above, the nozzle tip 16G is manufactured from two pieces 69A, 69B, having one piece 69A constituting the portion formed of high thermal conductivity material 66 and the other piece 69B constituting the portion formed of high strength material 68, and can be manufactured using the methods described above. In the embodiment shown in FIG. 20, the two pieces 69A, 69B may be integrally joined by welding only at an area nearest the outlet end 76, shown by weld zones 67. Because the pieces 69A, 69B are not joined at the inlet end 72, greater freedom for thermal expansion at that end 72 is permitted. Also like the nozzle tip 16, the nozzle tip 16G can be designed or arranged differently, including being manufactured from a different number of pieces 69, or by integrally joining in another manner. In this arrangement, the nozzle tip 16G will benefit from enhanced thermal conductivity near the mold gate and around the bore 64 and enhanced strength in the sealing region of the tip 16G.

Figure 21:
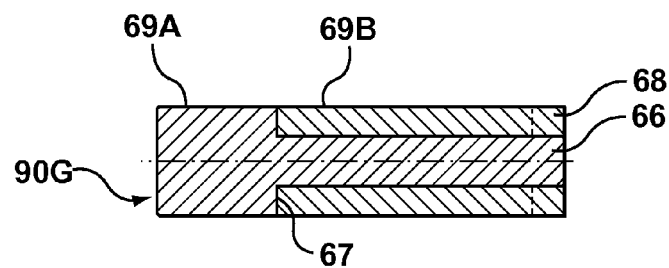
FIG. 21 is a cross-sectional view of a blank from which the composite nozzle tip of FIG. 20 is manufactured.

FIG. 21 illustrates a blank 90G used in manufacturing the nozzle tip 16F shown in FIG. 20. The blank 90G is comprised of a first piece 69A constituting the portion formed of high thermal conductivity material 66 and a second piece 69B constituting the portion formed of high strength material 68. As described above, the pieces 69A, 69B are machined to desired shapes and dimensions and are then integrally joined together, such as by EB welding, to form the blank 90G shown in FIG. 19. EB welding creates weld zones 67 between the pieces 69A, 69B. The blank 90G is then finish machined to create the shape of the nozzle tip 16G shown in FIG. 20, including creating the bore 64 and outlet openings 74 in the body 60.

Figure 22:
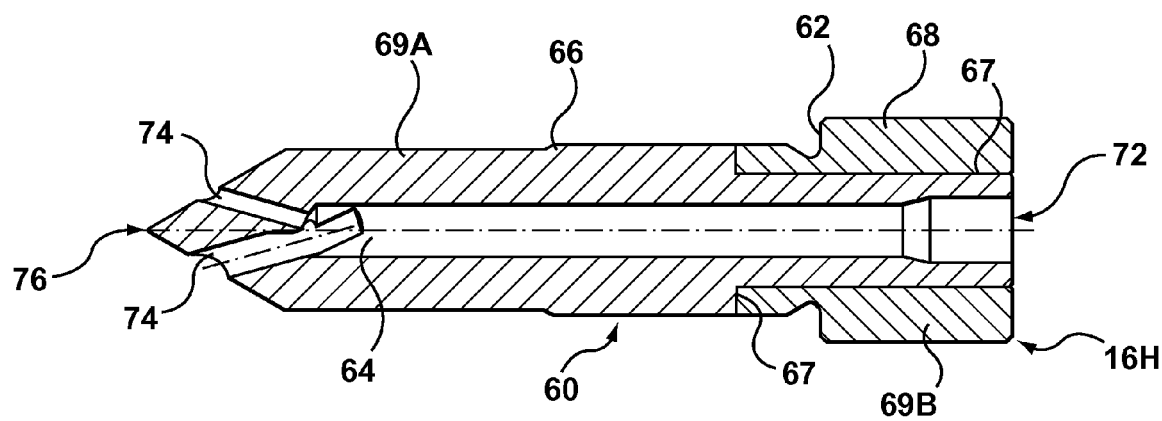
FIG. 22 is a cross-sectional view of another embodiment of a composite nozzle tip.

FIG. 22 illustrates another embodiment of a nozzle tip 16H. The nozzle tip 16H has a body 60 comprised of a first portion formed of a high thermal conductivity material 66 and a second portion formed of a high strength material 68, which are integrally joined together as described above. A weld zone 67 is indicated between the portions 66, 68. The nozzle tip 16H has a body 60 comprised of a flange 62 and a bore 64 that leads to two outlet openings 74 near the end 76 of the tip 16H. As illustrated in FIG. 22, the first portion formed of the high thermal conductivity material 66 surrounds the entire bore 64 and forms the bulk of the body 60 of the tip 16H, and the second portion formed of the high strength material 68 comprises the flange 62 and forms a shell around the high thermal conductivity material 66 extending slightly away from the flange 62. Like the composite nozzle tip 16 described above, the nozzle tip 16H is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the nozzle tip 16H can be designed or arranged differently, including being manufactured from a different number of pieces 69, or by integrally joining in another manner. In this arrangement, the nozzle tip 16H will benefit from enhanced thermal conductivity near the mold gate and around the bore 64 and enhanced strength in the sealing region of the tip 16H.

Figure 23:
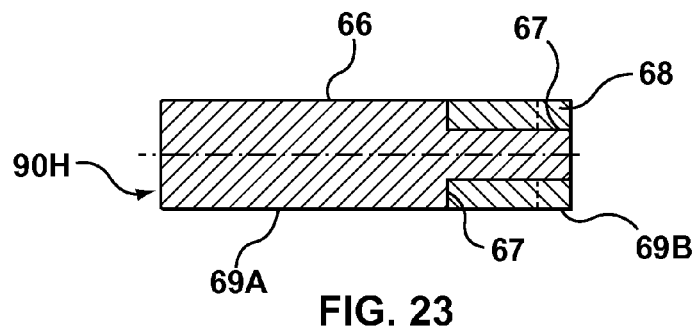
FIG. 23 is a cross-sectional view of a blank from which the composite nozzle tip of FIG. 22 is manufactured.

FIG. 23 illustrates a blank 90H used in manufacturing the nozzle tip 16H shown in FIG. 22. The blank 90H is comprised of a first piece 69A constituting the portion formed of high thermal conductivity material 66 and a second piece 69B constituting the portion formed of high strength material 68. As described above, the pieces 69A, 69B are machined to desired shapes and dimensions and are then integrally joined together, such as by EB welding, to form the blank 90H shown in FIG. 19. EB welding creates weld zones 67 between the pieces 69A, 69B. The blank 90H is then finish machined to create the shape of the nozzle tip 16H shown in FIG. 22, including creating the bore 64 and outlet openings 74 in the body 60.

Figure 24:
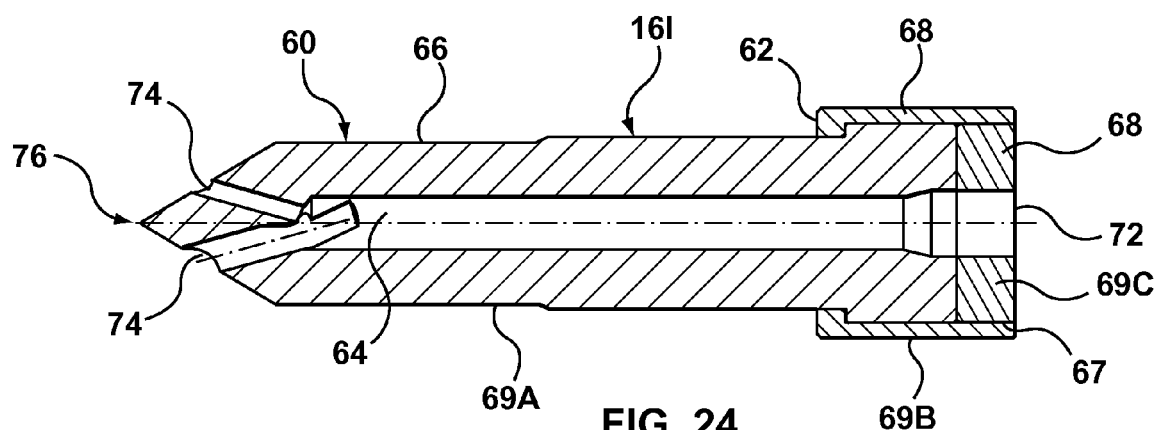
FIG. 24 is a cross-sectional view of another embodiment of a composite nozzle tip.

FIG. 24 illustrates another embodiment of a nozzle tip 16I. The nozzle tip 16I has a body 60 comprised of a first portion formed of a high thermal conductivity material 66 and a second portion formed of a high strength material 68, which are integrally joined together as described above. A weld zone 67 is indicated between the portions 66, 68. The nozzle tip 16I has a body 60 comprised of a flange 62 and a bore 64 that leads to two outlet openings 74 near the end 76 of the tip 16I. As illustrated in FIG. 24, the first portion formed of the high thermal conductivity material 66 surrounds nearly the entire bore 64 and forms the bulk of the body 60 of the tip 16I, and the second portion formed of the high strength material 68 comprises the flange 62 and a cap on the inlet end 72 of the tip 16I. In contrast to the embodiments described above, the nozzle tip 16I is manufactured from three pieces 69A, 69B, 69C having one piece 69A constituting the portion formed of high thermal conductivity material 66 and two pieces 69B, 69C joining to form the portion formed of high strength material 68. One of the high strength material pieces 69B forms the flange 62 and the other high strength material piece 69C forms the cap on the inlet end 72. The three-piece nozzle tip 16I can be manufactured using the methods described above, except that three pieces 69 will be joined together instead of two. Also, like the nozzle tip 16, the nozzle tip 16I can be designed or arranged differently, including being manufactured from a different number of pieces 69, or by integrally joining in another manner. In this arrangement, the nozzle tip 16I will benefit from enhanced thermal conductivity near the mold gate and around the bore 64 and enhanced strength in the sealing region of the tip 16I.

Figure 25:
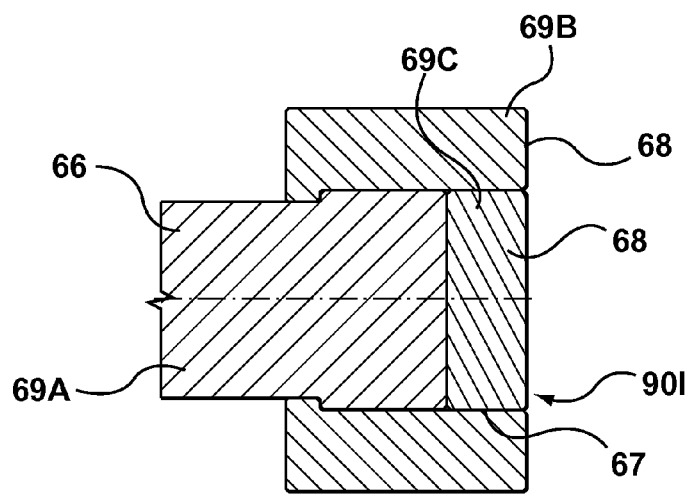
FIG. 25 is a cross-sectional view of a portion of a blank from which the composite nozzle tip of FIG. 24 is manufactured.

FIG. 25 illustrates a portion of a blank 90I used in manufacturing the nozzle tip 16I shown in FIG. 24. The blank 90I is comprised of a first piece 69A constituting the portion formed of high thermal conductivity material 66 and a second piece 69B and a third piece 69C constituting the portion formed of high strength material 68. As described above, the pieces 69A, 69B, 69C are machined to desired shapes and dimensions and are then assembled and integrally joined together, such as by EB welding, to form the blank 90I shown in FIG. 25. EB welding creates weld zones 67 between the pieces 69A, 69B, 69C. The blank 90I is then finish machined to create the shape of the nozzle tip 16I shown in FIG. 25, including creating the bore 64 and outlet openings 74 in the body 60.

Figure 26:
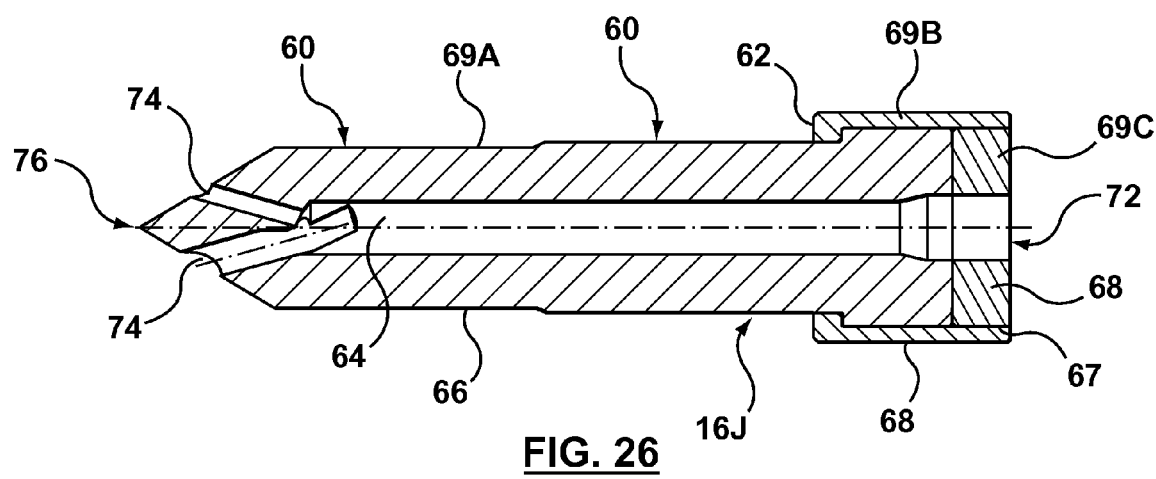
FIG. 26 is a cross-sectional view of another embodiment of a composite nozzle tip.

FIG. 26 illustrates another embodiment of a nozzle tip 16J. The nozzle tip 16J has a body 60 comprised of a first portion formed of a high thermal conductivity material 66 and a second portion formed of a high strength material 68, which are integrally joined together as described above. A weld zone 67 is indicated between the portions 66, 68. The nozzle tip 16J has a body 60 comprised of a flange 62 and a bore 64 that leads to two outlet openings 74 near the end 76 of the tip 16J. As illustrated in FIG. 26, the first portion formed of the high thermal conductivity material 66 surrounds nearly the entire bore 64 and forms the bulk of the body 60 of the tip 16J, and the second portion formed of the high strength material 68 comprises the flange 62 and a cap on the inlet end 72 of the tip 16J. In contrast to the embodiments described above, and similarly to the embodiment of FIGS. 24-25, the nozzle tip 16J is manufactured from three pieces 69A, 69B, 69C having one piece 69A constituting the portion formed of high thermal conductivity material 66 and two pieces 69B, 69C joining to form the portion formed of high strength material 68. One of the high strength material pieces 69B forms the flange 62 and the other high strength material piece 69C forms the cap on the inlet end 72. The three-piece nozzle tip 16J can be manufactured using the methods described above, except that three pieces 69 will be joined together instead of two. Also, like the nozzle tip 16, the nozzle tip 16J can be designed or arranged differently, including being manufactured from a different number of pieces 69, or by integrally joining in another manner. In this arrangement, the nozzle tip 16J will benefit from enhanced thermal conductivity near the mold gate and around the bore 64 and enhanced strength in the sealing region of the tip 16J.

Figure 27:
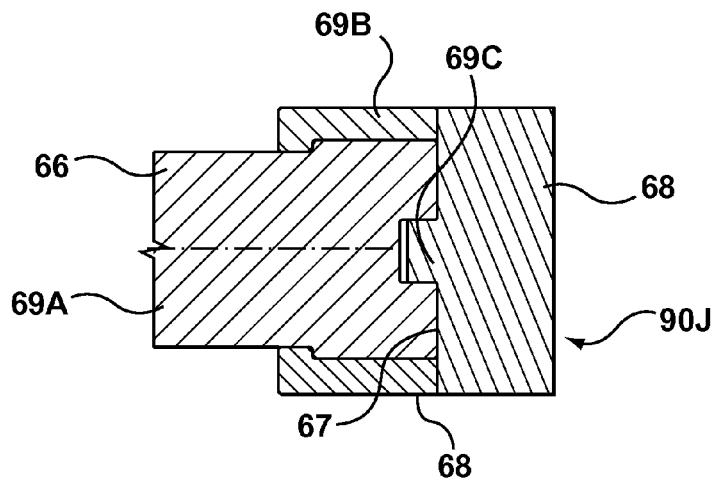
FIG. 27 is a cross-sectional view of a portion of a blank from which the composite nozzle tip of FIG. 26 is manufactured.

FIG. 27 illustrates a portion of a blank 90J used in manufacturing the nozzle tip 16J shown in FIG. 26. The blank 90J is comprised of a first piece 69A constituting the portion formed of high thermal conductivity material 66 and a second piece 69B and a third piece 69C constituting the portion formed of high strength material 68. As described above, the pieces 69A, 69B, 69C are machined to desired shapes and dimensions and are then assembled and integrally joined together, such as by EB welding, to form the blank 90J shown in FIG. 27. EB welding creates weld zones 67 between the pieces 69A, 69B, 69C. The blank 90J is then finish machined to create the shape of the nozzle tip 16J shown in FIG. 25, including creating the bore 64 and outlet openings 74 in the body 60.

Figure 13:
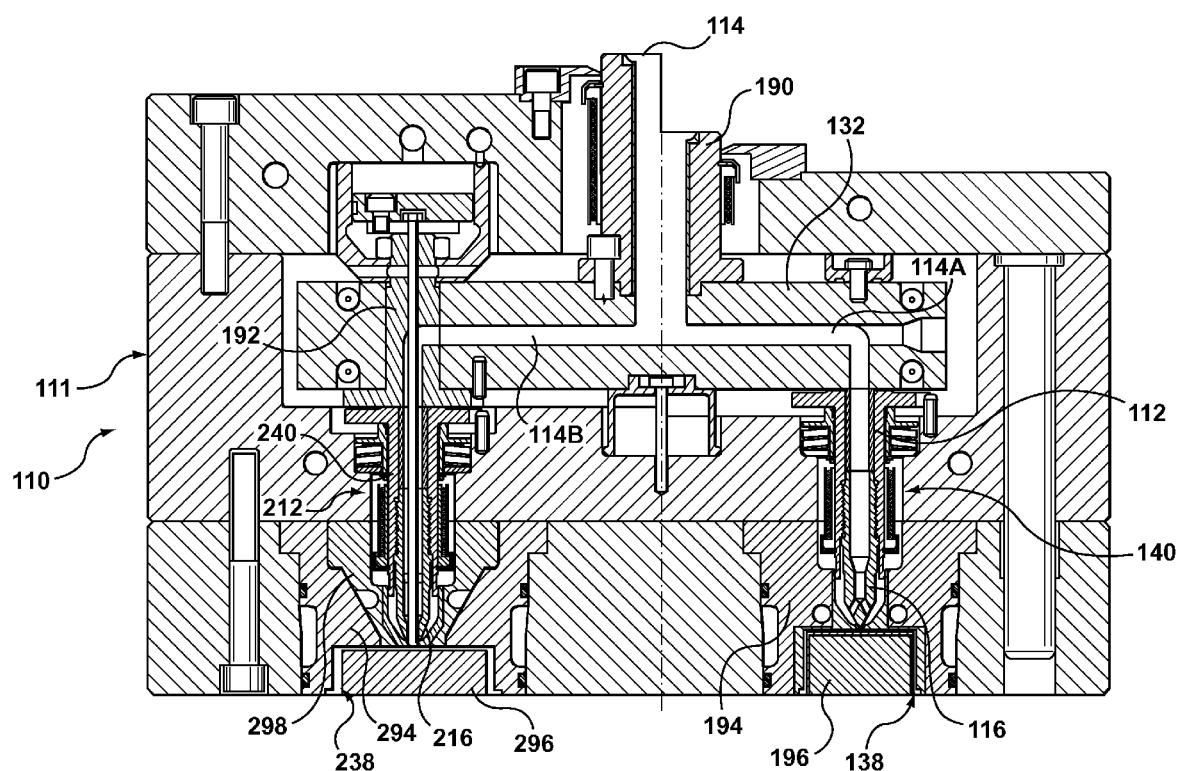
FIG. 13 is a cross-sectional view of one embodiment of a portion of an injection molding assembly, including a hot runner assembly.

Still further components of an injection molding assembly 10 can be produced using the method and composite structure described herein, incorporating a high thermal conductivity material 66 and a high strength material 68 integrally joined together. In accordance with the principles disclosed here, the high thermal conductivity material and the high strength material are precipitation hardenable from an unhardened state to a hardened state under the same conditions, as described above. In other examples, the component could be a sprue bushing, a manifold bushing, a sprue bar, one of various components of a conveying system, a machine nozzle, a mold cavity, or another component of the nozzle assembly 40. FIG. 13 illustrates an exemplary embodiment of a hot runner assembly 111 for an injection molding assembly 110 that includes both a hot-tip style nozzle assembly 140 and a valve-gate style nozzle assembly 240. The hot runner assembly 111 includes a melt channel 114 that flows through a sprue bushing 190 to a manifold 132 and then splits into a first melt channel 114A and a second melt channel 114B. The first melt channel 114A flows from the manifold 132 to the hot-tip nozzle assembly 140 and into a first mold cavity 138. The second melt channel 114B flows through a manifold bushing 192 and the valve-gate nozzle assembly 240 to enter a second mold cavity 238 through a gate insert 298. Each mold cavity 138, 238 is defined by a mold cavity insert 194, 294 and a core insert 196, 296 lining the respective mold cavity 138, 238. Each nozzle assembly 140, 240 has a nozzle housing 112, 212 that is connected to a nozzle tip 116, 216. Various components of the hot runner assembly 111 illustrated in FIG. 13 can be manufactured according to the method and composite structure defined herein, including the sprue bushing 190, the manifold bushing 192, the nozzle housings 112, 212, the gate insert 298, the cavity inserts 194, 294, and the core inserts 196, 296, as described below. Of course, the nozzle tips 116, 216 may also be manufactured in this manner, as described herein.

Figure 14:
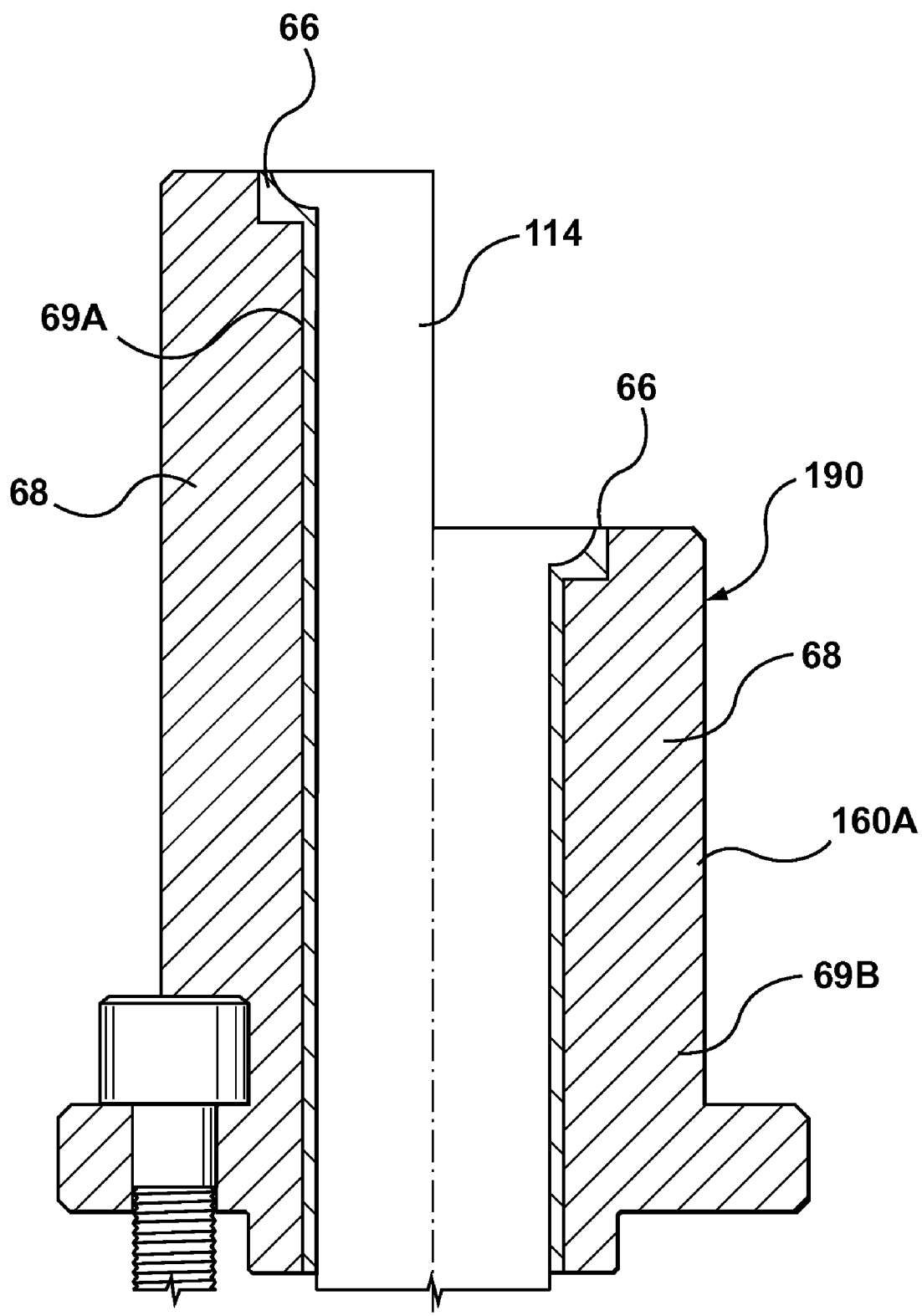
FIG. 14 is a cross-sectional view of a sprue bushing of the hot runner assembly of FIG. 13.

FIG. 14 illustrates a sprue bushing 190 as shown in FIG. 13, having a body 160A comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions, as described above. The high thermal conductivity material 66 is positioned proximate the melt channel 114 for supplying heat thereto, and the high strength material 68 is positioned in areas where greater structural integrity is desirable. Like the composite nozzle tip 16 described above, the sprue bushing 190 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the sprue bushing 190 can be designed or arranged differently, including being manufactured from a different number of pieces 69. In this arrangement, the sprue bushing 190 will benefit from enhanced thermal conductivity near the melt channel 114 and enhanced strength in other regions.

Figure 15:
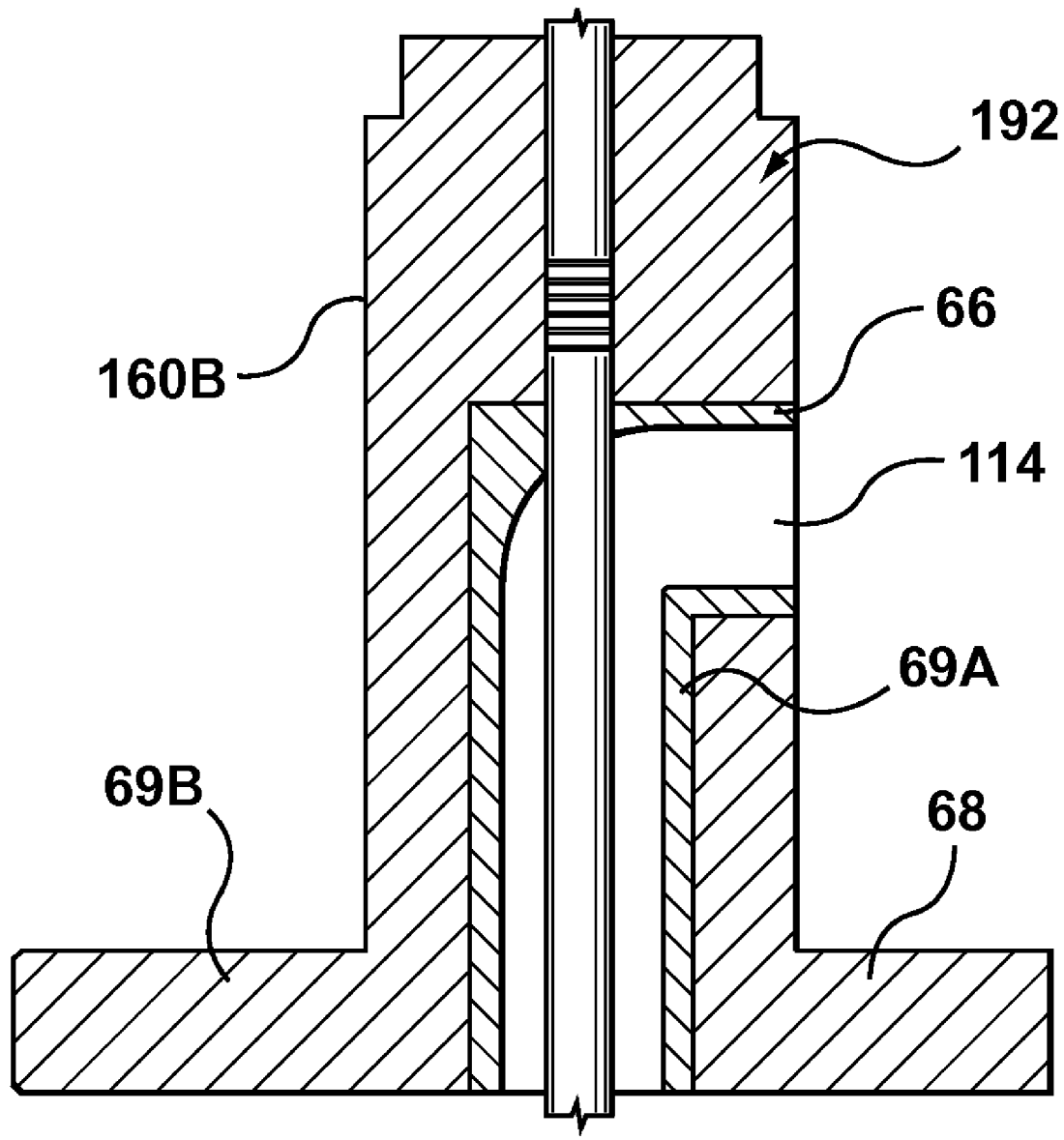
FIG. 15 is a cross-sectional view of a manifold bushing of the hot runner assembly of FIG. 13.

FIG. 15 illustrates a manifold bushing 192 as shown in FIG. 13, having a body 160B comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions, as described above. The high thermal conductivity material 66 is positioned proximate the melt channel 114 for supplying heat thereto, and the high strength material 68 is positioned in areas where greater structural integrity is desirable. Like the composite nozzle tip 16 described above, the manifold bushing 192 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the manifold bushing 192 can be designed or arranged differently, including being manufactured from a different number of pieces 69. In this arrangement, the manifold bushing 192 will benefit from enhanced thermal conductivity near the melt channel 114 and enhanced strength in other regions.

Figure 16:
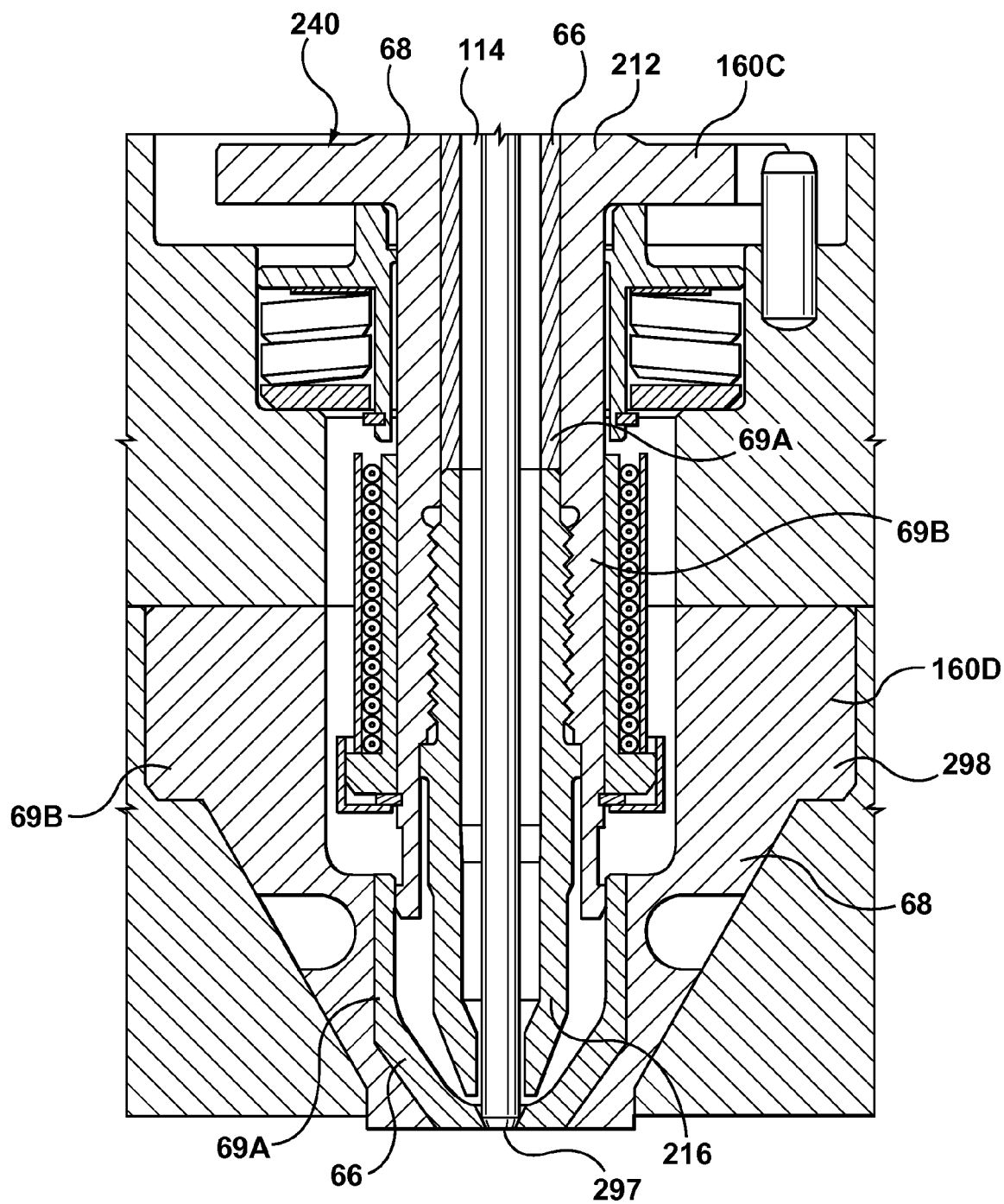
FIG. 16 is a cross-sectional view of a nozzle assembly and a gate insert of the hot runner assembly of FIG. 13.

FIG. 16 illustrates a nozzle assembly 240 as shown in FIG. 13, which includes a nozzle housing 212 having a body 160C comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions, as described above. The high thermal conductivity material 66 is positioned proximate the melt channel 114 for supplying heat thereto, and the high strength material 68 is positioned in areas where greater structural integrity is desirable. Like the composite nozzle tip 16 described above, the nozzle housing 212 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the nozzle housing 212 can be designed or arranged differently, including being manufactured from a different number of pieces 69. In this arrangement, the nozzle housing 212 will benefit from enhanced thermal conductivity near the melt channel 114 and enhanced strength in other regions, including sealing regions.

FIG. 16 also illustrates a gate insert 298 as shown in FIG. 13, having a body 160D comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions, as described above. The gate insert 298 has a passage 297 that permits the nozzle tip 216 to access the mold cavity 238. The high thermal conductivity material 66 is positioned around the passage 297, proximate the nozzle tip 216 and the melt channel 114 for conducting heat thereto and/or therefrom, and the high strength material 68 is positioned in areas where greater structural integrity is desirable. Like the composite nozzle tip 16 described above, the gate insert 298 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the gate insert 298 can be designed or arranged differently, including being manufactured from a different number of pieces 69. In this arrangement, gate insert 298 will benefit from enhanced thermal conductivity near the nozzle tip 216 and the melt channel 114 and enhanced strength in other regions, including sealing regions.

Figure 17:
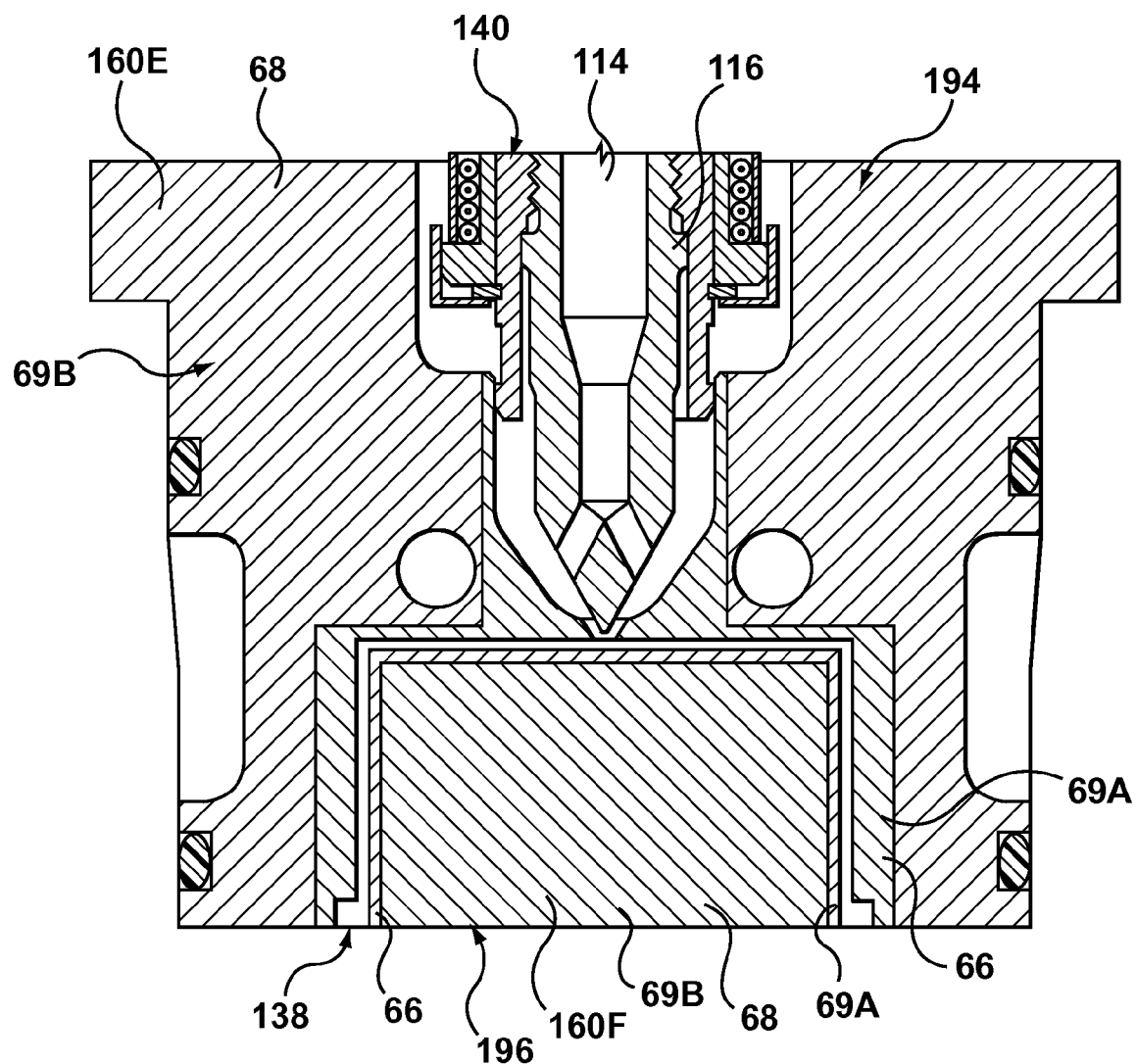
FIG. 17 is a cross-sectional view of a mold cavity of the hot runner assembly of FIG. 13, defined by a mold cavity insert and a core insert.

FIG. 17 illustrates a cavity insert 194 as shown in FIG. 13, having a body 160E comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions, as described above. The cavity insert 194 is adapted to define the injection molding cavity 138. The high thermal conductivity material 66 is positioned proximate the mold cavity 138 and the nozzle tip 116 for conducting heat thereto and therefrom, and the high strength material 68 is positioned in areas where greater structural integrity is desirable. Like the composite nozzle tip 16 described above, the cavity insert 194 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the cavity insert 194 can be designed or arranged differently, including being manufactured from a different number of pieces 69. In this arrangement, the cavity insert 194 will benefit from enhanced thermal conductivity near the mold cavity 138 and nozzle tip 116 and enhanced strength in other regions.

FIG. 17 also illustrates a core insert 196 as shown in FIG. 13, having a body 160F comprised of a first portion formed of a high thermal conductivity material 66 and a second portion formed of a high strength material 68, which are integrally joined together as described above. In accordance with the principles disclosed here, the high thermal conductivity material and the high strength material are precipitation hardenable from an unhardened state to a hardened state under the same conditions. The core insert 196 is adapted to define the injection molding cavity 138, in combination with the cavity insert 194. The high thermal conductivity material 66 is positioned proximate the mold cavity 138 and the nozzle tip 116 for conducting heat thereto and therefrom, and the high strength material 68 is positioned in areas where greater structural integrity is desirable. Like the composite nozzle tip 16 described above, the core insert 196 is manufactured from two pieces 69A, 69B, having one piece 69A constituting the portion formed of high thermal conductivity material 66 and the other piece 69B constituting the portion formed of high strength material 68, and can be manufactured using the methods described above. Also like the nozzle tip 16, the core insert 196 can be designed or arranged differently, including being manufactured from a different number of pieces 69. In this arrangement, the core insert 196 will benefit from enhanced thermal conductivity near the mold cavity 138 and nozzle tip 116 and enhanced strength in other regions.

Other components used as examples suitable for use with the composite high thermal conductivity material 66 and high strength material 68 described herein can be incorporated and used in ways known in the art. The composite structure provides benefits similar to those described herein, such as providing good thermal conductivity in combination with enhanced strength where necessary or advantageous.

Several alternative embodiments and examples have been described and illustrated herein. A person of ordinary skill in the art, given the benefit of this disclosure, will appreciate the features of the individual embodiments, and all of the suitable combinations and variations of the components. A person of ordinary skill in the art, given the benefit of this disclosure, will further appreciate that any of the embodiments can be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," etc., as used herein, are intended for illustrative purposes only, or for convenient reference, and do not limit the embodiments in any way. Additionally, the term "plurality," as used herein, indicates any number greater than one, either disjunctively or conjunctively, as necessary. Accordingly, while the specific embodiments have been illustrated and described, numerous modifications come to mind without significantly departing from the spirit of the invention and the scope of protection is only limited by the scope of the accompanying claims.

What is claimed is:

1. A composite material component for an injection molding assembly, comprises:
   a first portion formed of a precipitation hardened, high thermal conductivity material; and
   a second portion formed of a precipitation hardened, high strength material, wherein:
   the high thermal conductivity material and the high strength material are integrally joined together,
   the thermal conductivity of the high thermal conductivity material is greater than the thermal conductivity of the high strength material,
   at least one strength aspect of the high strength material has a value greater than the corresponding value of the same strength aspect of the high thermal conductivity material; and
   the high thermal conductivity material in an unhardened condition and the high strength material in an unhardened condition are precipitation hardenable together under the same precipitation hardening conditions to achieve:
      an increase in the value of at least one strength aspect of the high thermal conductivity material relative to the unhardened condition, and
      an increase in the value of at least one strength aspect of the high strength material relative to the unhardened condition wherein the component is selected from the group consisting of an injection molding nozzle tip, injection molding nozzle tip retainer, injection molding retainer plate, injection molding sprue bushing, injection molding manifold bushing, injection molding nozzle housing, injection molding gate insert, injection molding mold cavity insert, and an injection molding core insert.

2. The composite material component of claim 1, wherein the nozzle tip comprises a body having a flange adapted for connection to the injection molding assembly and a bore extending through the body.

3. The composite material component of claim 1, wherein the nozzle tip retainer comprises a body having threads adapted for connection to a nozzle assembly.

4. The composite material component of claim 1, wherein the retainer plate is adapted to be connected to a plurality of a nozzles of a multi-probe nozzle assembly.

5. The composite material component of claim 1, wherein the sprue bushing is for a hot runner assembly, the sprue bushing having a melt channel extending therethrough.

6. The composite material component of claim 5, wherein the first portion surrounds at least a portion of the melt channel.

7. The composite material component of claim 1, wherein the manifold bushing is for a hot runner assembly, the manifold bushing having a melt channel extending therethrough.

8. The composite material component of claim 7, wherein the first portion surrounds at least a portion of the melt channel.

9. The composite material component of claim 1, wherein the nozzle housing is for a nozzle assembly for a hot runner assembly, the nozzle housing adapted to support a nozzle tip.

10. The composite material component of claim 9, wherein the nozzle housing has a melt channel extending therethrough, and wherein the first portion surrounds at least a portion of the melt channel.

11. The composite material component of claim 1, wherein the gate insert is a valve-gate nozzle assembly for a hot runner assembly, the gate insert having a passage adapted to permit a nozzle tip of the nozzle assembly to access an injection molding cavity.

12. The composite material component of claim 1, wherein the mold cavity insert is for a hot runner assembly, the mold cavity insert adapted to define the shape of an injection molding cavity in combination with a core insert.

13. The composite material component of claim 1, wherein the core insert is for a mold cavity insert of a hot runner assembly, the core insert adapted to define the shape of an injection molding cavity in combination with a mold cavity insert.

14. The composite material component of claim 1, wherein the high thermal conductivity material in an unhardened condition and the high strength material in an unhardened condition can be precipitation hardened together at approximately 450° C. to achieve at least a 96% increase in at least one strength aspect of the high-strength material within three hours.

15. The composite material component of claim 1, wherein the at least one strength aspect of the high strength material and the at least one strength aspect of the high thermal conductivity material each comprise ultimate tensile strength.

16. The composite material component of claim 1, wherein the at least one strength aspect of the high strength material and the at least one strength aspect of the high thermal conductivity material each comprise yield strength.

17. The composite material component of claim 1, wherein the at least one strength aspect of the high strength material and the at least one strength aspect of the high thermal conductivity material each comprise endurance limit fatigue strength.

18. The composite material component of claim 1, wherein the high thermal conductivity material has a thermal conductivity of at least approximately 80 W m$^{-1}$ K$^{-1}$.

19. The composite material component of claim 1, wherein the high thermal conductivity material has an ultimate tensile strength of at least approximately 924 MPa.

20. The composite material component of claim 1, wherein the high thermal conductivity material is a copper alloy.

21. The composite material component of claim 20, wherein the high thermal conductivity material is a beryllium-copper alloy.

22. The composite material component of claim 21, wherein the high thermal conductivity material contains approximately 0.2-0.6% Be and 1.4-2.2% Ni, with balance Cu.

23. The composite material component p of claim 1, wherein the precipitation hardened high strength material has an ultimate tensile strength of at least approximately 2000 MPa, a yield strength of at least approximately 1950 MPa, or an endurance limit fatigue strength of at least approximately 850 MPa.

24. The composite material component of claim 1, wherein the high strength material has a thermal conductivity of at least approximately 15 W m$^{-1}$ K$^{-1}$.

25. The composite material component of claim 1, wherein the high strength material is an iron alloy.

26. The composite material component of claim 25, wherein the high strength material is a maraging steel.

27. The composite material component of claim 26, wherein the high strength material contains approximately 18.5% Ni, 7.5-12.0% Co, and 3.25-4.8% Mo, with balance Fe.

28. The composite material component of claim 1, wherein the high thermal conductivity material and the high-strength material are integrally joined together by welding.

29. The composite material component of claim 28, wherein the high thermal conductivity material and the high-strength material are integrally joined together by electron beam welding.

30. The composite material component of claim 1, wherein the high thermal conductivity material and the high-strength material are integrally joined together by brazing.

31. The composite material component of claim 1, wherein the high thermal conductivity material in an unhardened condition and the high strength material in an unhardened condition can be precipitation hardened together under the same precipitation hardening conditions to achieve at least a 96% increase in at least one strength aspect of the high strength material within six hours.

32. The composite material component of claim 1, wherein the precipitation hardening conditions comprise an aging temperature in the range of from 315° C. to 540° C.

33. The composite material component of claim 32, wherein the aging temperature is in the range of from 425° C. to 510° C.

34. The composite material component of claim 33, wherein the aging temperature is approximately 450° C.

* * * * *